(12) United States Patent
Puura et al.

(10) Patent No.: US 9,195,980 B2
(45) Date of Patent: Nov. 24, 2015

(54) METHOD AND APPARATUS FOR RECOVERY DURING AUTHENTICATION

(75) Inventors: Sami Mikael Puura, Helsinki (FI); Mika Kristian Hirvikorpi, Espoo (FI)

(73) Assignee: Nokia Technologies Oy, Espoo (FI)

( * ) Notice: Subject to any disclaimer, the term of this patent is extended or adjusted under 35 U.S.C. 154(b) by 496 days.

(21) Appl. No.: 12/610,028

(22) Filed: Oct. 30, 2009

(65) Prior Publication Data

US 2011/0106709 A1   May 5, 2011

(51) Int. Cl.
| | |
|---|---|
| G06Q 20/00 | (2012.01) |
| G06Q 20/32 | (2012.01) |
| H04W 4/24 | (2009.01) |
| G06Q 20/20 | (2012.01) |
| G06Q 20/38 | (2012.01) |
| G06Q 20/40 | (2012.01) |
| G06Q 30/06 | (2012.01) |
| H04L 29/06 | (2006.01) |

(Continued)

(52) U.S. Cl.
CPC ............... *G06Q 20/32* (2013.01); *G06Q 20/20* (2013.01); *G06Q 20/322* (2013.01); *G06Q 20/3223* (2013.01); *G06Q 20/3224* (2013.01); *G06Q 20/3255* (2013.01); *G06Q 20/382* (2013.01); *G06Q 20/40* (2013.01); *G06Q 30/06* (2013.01); *H04L 63/18* (2013.01); *H04L 67/02* (2013.01); *H04W 4/12* (2013.01); *H04W 4/24* (2013.01); *H04W 12/06* (2013.01); *H04W 48/20* (2013.01)

(58) Field of Classification Search
CPC . G06Q 20/32; G06Q 20/3255; G06Q 20/382; G06Q 20/322
USPC ...................................... 705/64, 67; 713/170
See application file for complete search history.

(56) References Cited

U.S. PATENT DOCUMENTS

| | | | |
|---|---|---|---|
| 6,640,097 B2 | 10/2003 | Corrigan et al. | |
| 7,337,229 B2 | 2/2008 | Dutta et al. | |

(Continued)

FOREIGN PATENT DOCUMENTS

| | | |
|---|---|---|
| CN | 1728667 A | 2/2006 |
| WO | WO 03/084175 A1 | 10/2003 |

(Continued)

OTHER PUBLICATIONS

International search report and written opinion for corresponding international application No. PCT/FI2010/050766 dated Feb. 2, 2010, pp. 1-11.

(Continued)

*Primary Examiner* — Steven Kim
(74) *Attorney, Agent, or Firm* — Ditthavong & Steiner, P.C.

(57) ABSTRACT

Techniques for recovery during authentication include initiating sending a HyperText Transfer Protocol (HTTP) authentication message from user equipment of a user to a merchant node of a merchant. If the user is not authenticated in response to the HTTP authentication message, then sending a Short Message Service (SMS) message from the user equipment to the merchant node is initiated. The SMS message indicates a transaction between the user and the merchant. In some embodiments, techniques include changing an access point to a network until an access point utilized is on a list of acceptable access points, in response to a buy response message that indicates a transaction between a merchant and a user. A hypertext transfer protocol authentication message is sent through the access point that is on the list of acceptable access points.

22 Claims, 14 Drawing Sheets

(51) Int. Cl.
*H04W 4/12* (2009.01)
*H04W 12/06* (2009.01)
*H04L 29/08* (2006.01)
*H04W 48/20* (2009.01)

(56) References Cited

U.S. PATENT DOCUMENTS

| | | | |
|---|---|---|---|
| 7,512,098 B2 | 3/2009 | Jiang et al. | |
| 7,606,560 B2* | 10/2009 | Labrou et al. | 455/411 |
| 7,801,826 B2* | 9/2010 | Labrou et al. | 705/67 |
| 7,953,032 B2* | 5/2011 | Liang | 370/311 |
| 2002/0163938 A1* | 11/2002 | Tuomainen et al. | 370/468 |
| 2003/0097593 A1* | 5/2003 | Sawa et al. | 713/201 |
| 2003/0167204 A1* | 9/2003 | Makipaa | 705/14 |
| 2003/0200184 A1* | 10/2003 | Dominguez et al. | 705/78 |
| 2004/0076126 A1* | 4/2004 | Qu et al. | 370/320 |
| 2004/0107282 A1* | 6/2004 | Chakraborty et al. | 709/229 |
| 2004/0196783 A1* | 10/2004 | Shinomiya | 370/216 |
| 2005/0108520 A1* | 5/2005 | Yamamoto et al. | 713/155 |
| 2005/0256802 A1 | 11/2005 | Ammermann et al. | |
| 2005/0289641 A1* | 12/2005 | Miura et al. | 726/4 |
| 2006/0010230 A1* | 1/2006 | Karklins et al. | 709/223 |
| 2006/0025141 A1* | 2/2006 | Marsh et al. | 455/445 |
| 2006/0160524 A1* | 7/2006 | Borella | 455/411 |
| 2006/0265243 A1 | 11/2006 | Racho et al. | |
| 2006/0265339 A1* | 11/2006 | Vakil et al. | 705/76 |
| 2006/0282382 A1* | 12/2006 | Balasubramanian et al. | 705/44 |
| 2007/0112676 A1* | 5/2007 | Kontio et al. | 705/50 |
| 2008/0172449 A1* | 7/2008 | Bengtsson et al. | 709/203 |
| 2008/0182551 A1* | 7/2008 | Lovell | 455/407 |
| 2008/0313710 A1* | 12/2008 | Doi et al. | 726/3 |
| 2010/0029306 A1 | 2/2010 | Sarmah et al. | |
| 2010/0153227 A1* | 6/2010 | Medvinsky et al. | 705/26 |
| 2010/0205053 A1* | 8/2010 | Shuster | 705/14.17 |
| 2010/0220585 A1* | 9/2010 | Poulson et al. | 370/216 |
| 2010/0312681 A1* | 12/2010 | Sogo et al. | 705/35 |

FOREIGN PATENT DOCUMENTS

| | | |
|---|---|---|
| WO | WO 2004/053640 A2 | 6/2004 |
| WO | WO 2005/125223 A1 | 12/2005 |
| WO | 2009083999 A1 | 7/2009 |
| WO | WO 2009/083999 A1 | 7/2009 |

OTHER PUBLICATIONS

Chinese Office Action corresponding to Patent Application No. 201080049143.1, dated Dec. 19, 2014, with English-language summary; 8 pages.

Office Action for corresponding Chinese Application No. 201080049143.1, dated Apr. 30, 2014, 9 pages (English Language Summary Included).

Office Action for corresponding Chinese Patent Application No. 201080049143.1 dated Jun. 25, 2015, with English-language summary, 6 pages.

* cited by examiner

METHOD AND APPARATUS FOR RECOVERY DURING AUTHENTICATION

BACKGROUND

Most users of mobile and fixed communication devices pay for access to a communications network through a subscription with a network operator. The arrangement of payments from users by the network operator is called operator billing and is implemented in the network by an operator billing system that tracks user consumption of network resources, tracks charges for such use, and tracks payments from users. In direct operator billing, a merchant different from the network operator uses the network operator's billing system to extract payment from a user for a product ordered or delivered through the user's communication device, rather than duplicating functions to obtain and track payments from users. Charging a user of a mobile communication device is challenging because the device does not have a fixed network address that can be associated with the user.

To charge the user of a mobile device for a product, the merchant's system authenticates a user to get a user identifier suitable for billing by the operator, such as a subscriber identifier for the user, rather than the current network address of the user's mobile device. A common authentication method supported by many operators is based on a HyperText Transfer Protocol (HTTP) message directed to the merchant's system, typically addressed on the communications network by a Universal Resource Locator (URL). In this common mechanism, an access point of the operator's network adds a subscriber identifier to the header portion of the HTTP message. HTTP URL authentication works well when the user's mobile communications device is connected to the network through Wireless Applications Protocol (WAP) access points. However, if the user's mobile communication device happens to have a default access point defined to be something else (e.g., a WiFi access point or Internet access point, among others) the HTTP message is not associated with a subscriber of the operator by the access point, so authentication fails—leading to failure of operator billing, and an unsatisfying user experience.

SOME EXAMPLE EMBODIMENTS

Therefore, there is a need for an approach for authentication of a user even when the user's mobile communication device connects to a communications network through a non-WAP access point. One approach presented herein is called Short Message Service (SMS) recovery during authentication for operator billing.

According to one embodiment, a method comprises initiating sending a hypertext transfer protocol authentication message from user equipment of a user to a merchant node of a merchant. The method further comprises initiating sending a short message service message from the user equipment to the merchant node, if the user is not authenticated in response to the hypertext transfer protocol authentication message. The short message service message indicates a transaction between the merchant and the user.

According to another embodiment, an apparatus comprises at least one processor, and at least one memory including computer program code. The at least one memory and the computer program code are configured to, with the at least one processor, cause, at least in part, the apparatus to initiate sending an hypertext transfer protocol authentication message for a user of the apparatus to a merchant node of a merchant. The apparatus is also caused to initiate sending, to the merchant node, a short message service message, if the user is not authenticated in response to the hypertext transfer protocol authentication message. The short message service message indicates a transaction between the merchant and the user.

According to another embodiment, an apparatus comprises at least one processor, and at least one memory including computer program code. The at least one memory and the computer program code are configured to, with the at least one processor, cause, at least in part, the apparatus to generate a buy response message that indicates a transaction between a merchant and a user. The apparatus is also caused to initiate sending the buy response message using hypertext transfer protocol to user equipment of the user. The apparatus is further caused to receive a short message service message which indicates the transaction and an identifier for the user. The apparatus is further caused to authenticate the user based on the short message service message.

According to another embodiment, a method comprises facilitating access, including granting access rights, to a service. The service includes sending, using hypertext transfer protocol, a buy response message that indicates a transaction between a merchant and a user. The service further receives a short message service message that indicates the transaction and an identifier for the user. for the service authenticates the user based on the short message service message.

According to another embodiment, a computer-readable storage medium carries one or more sequences of one or more instructions, which, when executed by one or more processors, cause, at least in part, an apparatus to initiate sending a hypertext transfer protocol authentication message for a user of the apparatus to a merchant node of a merchant. The apparatus is also caused to initiate sending, to the merchant node, a short message service message, if the user is not authenticated in response to the hypertext transfer protocol authentication message. The short message service message indicates a transaction between the merchant and the user.

According to another embodiment, a computer-readable storage medium carries one or more sequences of one or more instructions, which when executed by one or more processors, cause, at least in part, an apparatus to generate a buy response message that indicates a transaction between a merchant and a user. The apparatus is also caused to initiate sending the buy response message using hypertext transfer protocol to user equipment of the user. The apparatus is further caused to receive an short message service message which indicates the transaction and an identifier for the user. The apparatus is further caused authenticate the user based on the short message service message.

According to another embodiment, an apparatus comprises means for sending a hypertext transfer protocol authentication message for a user of the apparatus to a merchant node of a merchant. The apparatus further comprises means for sending, to the merchant node, a short message service message, if the user is not authenticated in response to the hypertext transfer protocol authentication message. The short message service message indicates a transaction between the merchant and the user.

According to another embodiment, an apparatus comprises means for generating a buy response message that indicates a transaction between a merchant and a user. The apparatus further comprises means for sending the buy response message using hypertext transfer protocol to user equipment of the user. The apparatus further comprises means for receiving a short message service message which indicates the transaction and an identifier for the user. The apparatus further comprises means for authenticating the user based on the short message service message.

According to another embodiment, a method comprises changing an access point to a network until an access point utilized is on a list of acceptable access points, in response to a buy response message that indicates a transaction between a merchant and a user. A hypertext transfer protocol authentication message is sent through the access point that is on the list of acceptable access points. In some embodiments, the list of acceptable access points is a list of wireless access protocol access points.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
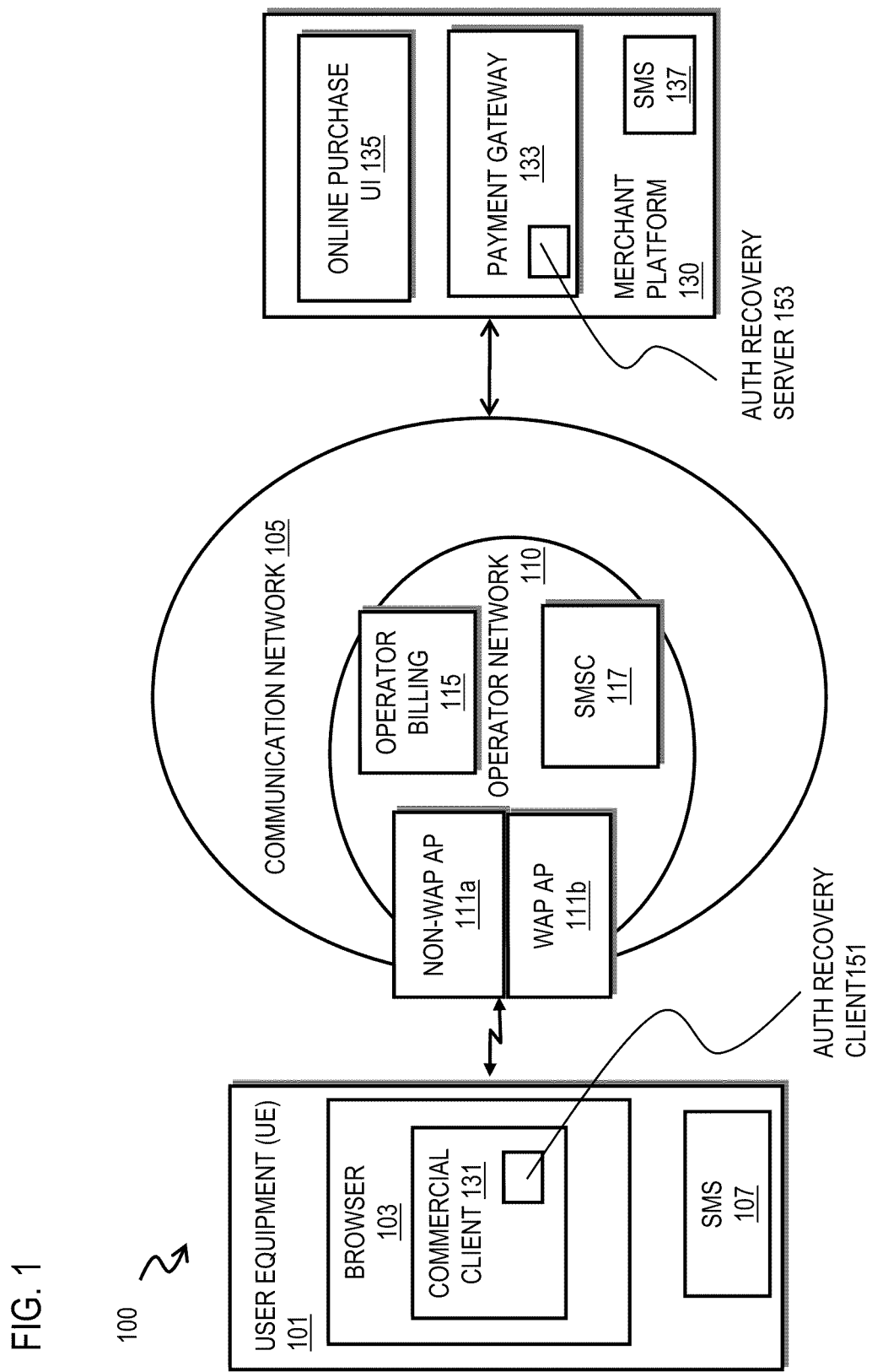
FIG. 1 is a diagram of a system providing recovery during authentication for operator billing, according to one embodiment.

Examples of a method, apparatus, and computer program are disclosed for providing recovery during authentication for operator billing. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term operator refers to an operator of a communications network or portion thereof, including network and Internet, wired and wireless, service providers. A user refers to a person who connects to the operator's network, including a subscriber to the operator's communication network service, for example, a subscriber to a pre-paid, pre-arranged or invoiced subscription for network service. In a pre-paid subscription, charges are deducted from an amount the user has already paid to the operator. In a pre-arranged payment subscription, payments for accumulated charges are extracted with user permission automatically from one or more bank or credit accounts of the user on a regular schedule, e.g., monthly. In an invoiced subscription, the user is sent a written electronic or paper invoice describing resources provided and accumulated charges; and the user sends a payment in response to the written description. A used herein, a merchant is a commercial entity different from the provider, which provides goods or services that are selected or delivered over the communications network to the user. As used herein a network node, or simply node, is any wired or wireless device that is in communication with a communications network to originate or terminate messages or to relay messages.

Although various embodiments are described with respect to a user connecting to the provider's network with a cell phone to purchase a product using operator billing, it is contemplated that the approach described herein may be used with other wired and wireless user equipment, such as laptop and desk top computers, personal digital assistants, and network appliances and during authentication relating to any product or service, not just for operator billing.

As described above, in direct operator billing, a merchant different from the network operator uses the network operator's billing system to extract payment from a user for a product ordered or delivered through the user's mobile or wired communication device, rather than duplicating functions to obtain and track payments from users. Typically, the merchant has a public site (called a front-end) on one or more nodes of the communications network where the user can view and select the merchant's products. In communications hidden from the user (called a back-end), the merchant's back-end system on the same or different nodes integrates to the operator billing system on one or more different nodes via an application programming interface (API).

To charge the user for a product, the merchant's back-end system authenticates a user to get a user identifier suitable for billing by the operator, such as a subscriber identifier for the user, also called a customer ID (C ID). This C ID can be Mobile Subscriber Integrated Services Digital Network Number (MSISDN, which is a cell telephone number) or some other identifier defined by the operator, such as an International Mobile Subscriber Identity (IMSI) identifier, an email address or Short Message Service (SMS) short code. IMSI is a unique 15-digit code used to identify an individual user on a global system for mobile communications (GSM) network. An IMSI value is typically stored on a Subscriber Identity Module (SIM card), a device used to store information in many mobile phones, especially for advanced features.

A common authentication method supported by many operators is based on a hypertext transfer protocol (HTTP) message directed to the merchant's front-end or back-end system, typically using a Uniform Resource Locator (URL) to address the merchant system on the communications network. In this common mechanism, a client process on the user's mobile communications device sends an HTTP GET message to the merchant's authentication URL, and a network node, such as an access point, of the operator adds a subscriber identifier to the header portion of the HTTP message. HTTP URL authentication works well when the user's mobile communications device is connected to the network through certain access points, called Wireless Applications Protocol (WAP) access points. If the user's mobile communication device happens to have a default access point defined to be something else (e.g. WiFi access point, Internet access point, among others) authentication may fail—leading to failure of operator billing, and an unsatisfying user experience FIG. 1 is a diagram of a system 100 providing recovery during authentication for operator billing, according to one embodiment. When HTTP URL authentication does not work well to reveal to the merchant a customer identifier (C ID) for the user known by the operator, system 100 can recover by finding a proper access point or by inducing an SMS message that reveals to the merchant an alternative C ID known to the operator. The alternative C ID can be used by the merchant to invoke operator billing.

As shown in FIG. 1, the system 100 comprises user equipment (UE) 101 having connectivity to a merchant platform 130 via a communication network 105. By way of example, the communication network 105 of system 100 includes one or more networks such as a data network (not shown), a wireless network (e.g., operator network 110), a telephony network not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. At least a portion 110 of network 105 is under the administrative control of a network operator, and is called the operator network 110 herein.

The communications network 105 includes one or more access points (APs) for wireless devices, such as non-WAP AP 111a and a WAP AP 111b, collectively called herein APs 111. One or more of these APs are in the operator network 110 portion of network 105. WAP, well known in the art, is designed to transmit, over a wireless link, video and image content, such as Web pages transmitted using HTTP and graphical user interfaces, to a wireless device, such as a cell phone, which has limited display screen area and possibly limited bandwidth. The operator network 110 also includes an operator billing system 115, as described above, and a Short Message System (SMS) control system (SMSC) 117. The SMSC 117 handles, stores and forwards short messages in a mobile telephone network. The SMS is used to provide cell phone connection information in a mobile telephone network, but has come to be a popular way to send messages, primarily text, between end users for an application called text messaging. The SMS messages can be used between any pair devices that support SMS, such as any pair of third generation (3G) communication devices, in communication with the operator network 110 directly or indirectly through network 105.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

The merchant platform 130 is one or more network nodes that host applications that support the presentation, sale or delivery of products offered by the merchant, or some combination, generally referred to as e-commerce. The front end processes are represented by the online purchase user interface (UI) 135; and the back end processes are represented by payment gateway 133. The merchant platform 130 also includes an SMS module 137. The SMS module 137 is used to compose, send, receive, store and display SMS messages on merchant platform 130. SMS modules are well known in the art.

By way of example, the UE 101 and merchant platform 130 communicate with each other, and with other components of the communication network 105, using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the HyperText Transfer Protocol (HTTP) with any of a large number of servers called World Wide Web servers that provide web pages.

The UE 101 includes a browser 103 and an SMS module 107. The SMS module 107 is used to compose, send, receive, store and display SMS messages on UE 101. Browsers and SMS modules are well known in the art. In the illustrated embodiment, the browser 103 includes a plug-in application or transient script that functions as a commercial client process 131 for interacting with the online purchase UI 135. The commercial client 131 presents graphical elements from the online purchase UI 135 and captures and sends user actions, such as pointer moves and key strokes so that a user can navigate the products and initiate a purchase. Messages are exchanged between commercial client 131 on UE 101 and online purchase UI 135 on merchant platform 130 using any application layer protocol, including HTTP among others. The online purchase UI 135 performs some functions of a commercial server for the merchant. In some embodiments, the commercial client is not part of a browser but is part of another application or is stand alone.

According to some embodiments, the commercial client 131 on UE 101 includes an authentication recovery client 151 that communicates with an authentication recovery server 153 on merchant platform 130, as described in more detail below. The authentication recovery client 151 determines whether an HTTP URL message was successful in obtaining authorization; and, if not, then recovering by changing access points or sending an recovery message using a different protocol, such as SMS, to achieve authentication. The authentication recovery server 153 provides a transaction identifier to be used in the recovery message; and, uses an identifier for the user in the received recovery message to complete the operator billing.

Although nodes, modules and processors are shown in the illustrated embodiment as integral blocks in a particular arrangement for purposes of illustration, in other embodiments, one or modules or processes, or portions thereof, are arranged in a different order on the same or different nodes, or the arrangement is changed in some combination of ways.

Figure 2:
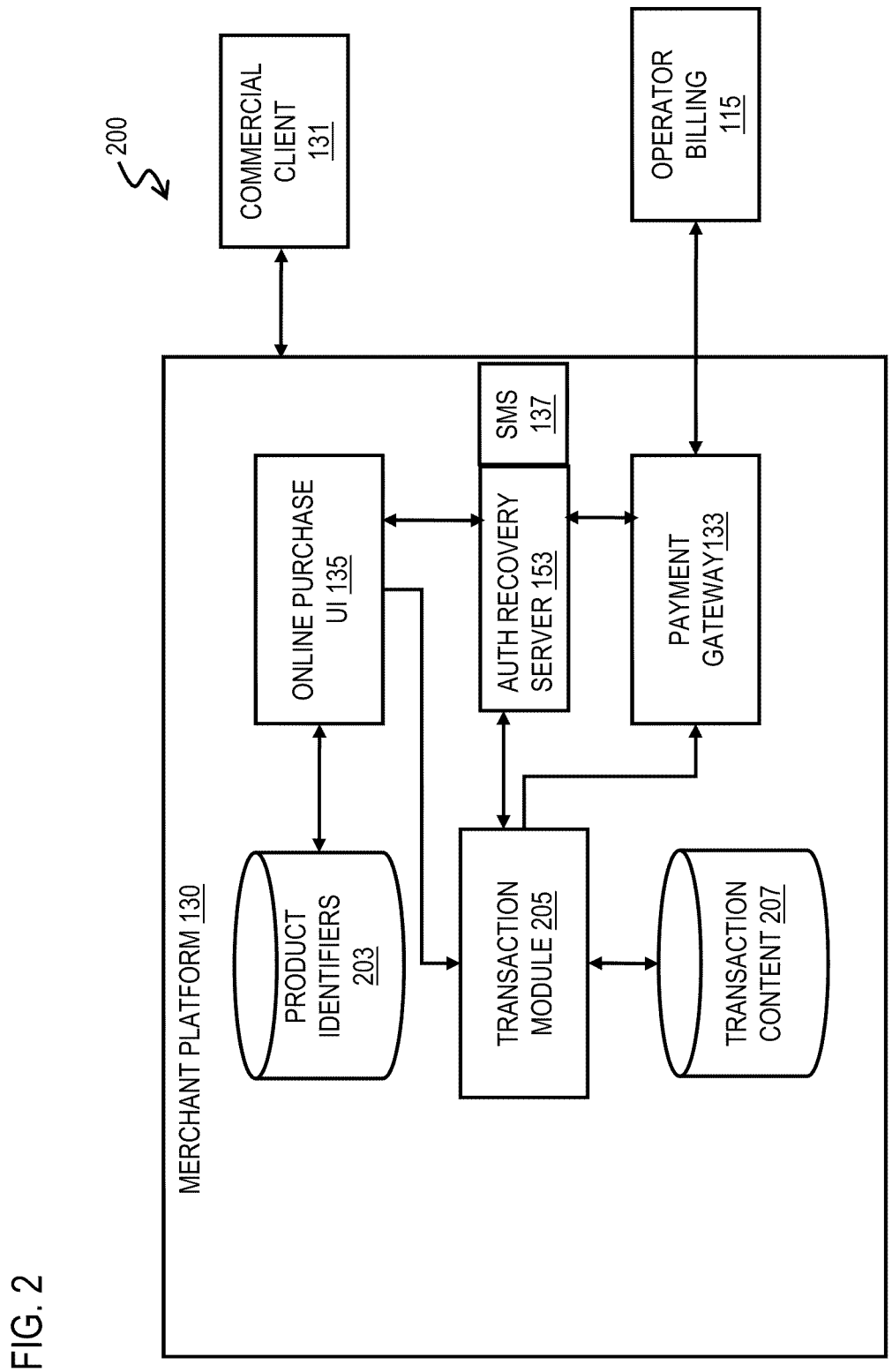
FIG. 2 is a diagram of the components of merchant platform for providing recovery during authentication for operator billing, according to one embodiment.

FIG. 2 is a diagram of the components 200 of merchant platform 130 for providing recovery during authentication for operator billing, according to one embodiment. By way of example, the merchant platform 130 includes one or more components for providing recovery during authentication for operator billing. It is contemplated that the functions of these components may be combined in one or more components or performed by other components of equivalent functionality. One or more of these components are implemented on computer system 900, or chip set 1000 described in more detail below with reference to FIG. 9 and FIG. 10, respectively.

In the illustrated embodiment, the merchant platform 130 includes the payment gateway 133, the online purchase UI 135, a product identifiers data structure 203, a transaction module 205, transaction content data structure 207, authentication recovery server 153 and SMS module 137. The merchant platform 130 interacts with commercial client 131, e.g., on UE 101, and operator billing system 115, e.g., in network 110. According to the illustrated embodiment, in transaction module 205 the merchant platform 130 generates a transaction whereby a product and price is selected based on user input received through the online purchase UI, and the transaction is stored in transaction content database 207. In some embodiments, a unique transaction identifier (TX ID) is defined and then used as an index into the transaction content data structure 207. The transaction is provided to the payment gateway 133 through the transaction module and used to bill the user through the operator billing system 115.

As described in more detail below, the authentication recovery server 153 interacts with processes 133, 135 and 205, and adds fields to certain sent messages and extracts field from certain received messages to deduce a C ID for the user and provide that C ID to payment gateway 133 for operator billing.

Although processes, modules and data structures are shown as integral blocks in particular locations on certain nodes for purposes of illustration, in other embodiments one or more processes, modules or data structures, or portions thereof, are arranged in a different order on the same or different network nodes. Thus, authentication recovery server 153 may be included within the payment gateway process 133 as shown in FIG. 1, or separate as shown in FIG. 2.

Figure 3A:
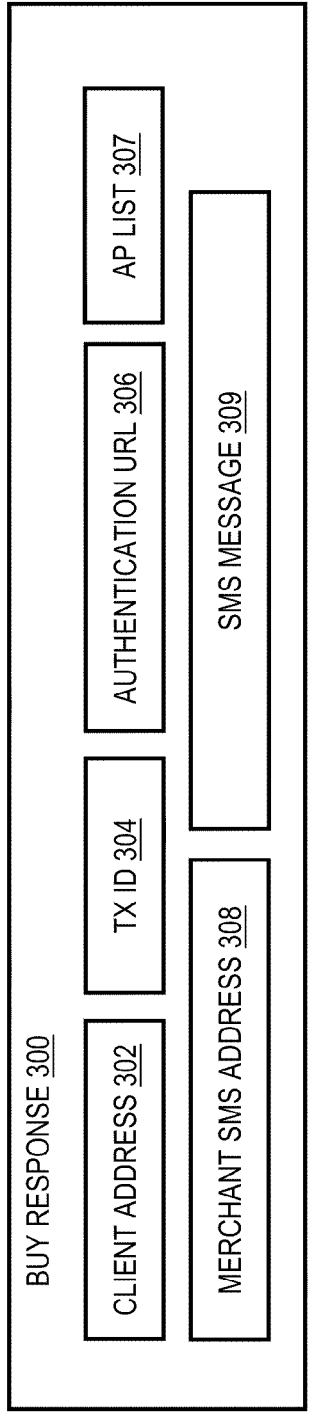
FIG. 3A through FIG. 3E are block diagrams of data fields in messages for providing recovery, according to an embodiment.
Figure 3B:
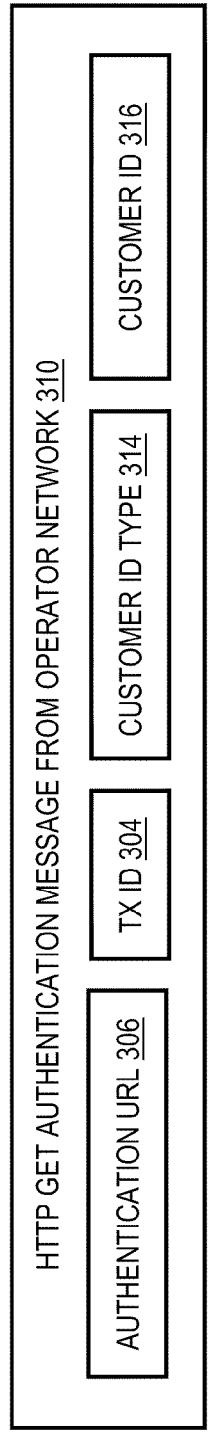

FIG. 3A through FIG. 3E are block diagrams of data fields in messages for providing recovery, according to an embodiment. Messages that are not changed from other approaches are not shown. FIG. 3A depicts a modified buy response message 300 sent by the merchant platform 130, e.g., by the front end online purchase UI process 135, to the UE 101, e.g., to the commercial client 131. The message may be encapsulated in any appropriate protocols, e.g. in HTTP or WAP messages. This buy response message 300 includes a client address field 302, a transaction (TX) identifier (ID) field 304, and an authentication URL field 306. Unlike prior approaches, the modified buy response message 300 includes a merchant SMS address field 308 and an optional SMS message field 309. In some embodiments, the modified buy response message 300 includes AP list field 307 of access points, such as WAP access points, that successfully support HTTP authentication.

Buy response message 300 is sent by the merchant platform 130 in response to a buy request message from the user equipment, e.g., UE 101. As is well known in the art, a buy request message comes from the UE of the user attempting to purchase a product presented by the merchant's platform. The request message holds data that indicates the user node making the request, e.g., a Internet Protocol (IP) address for UE 101, data that indicates the product to be purchased or delivered (such as a product ID), data that indicates the provider network (such as Mobile Network Code, MNC, and Mobile Country Code, MCC, to uniquely identify a mobile phone operator), and data that indicates an amount for the product. These data fields and any other associated data, not shown, are used to define a transaction and are stored in the transaction content data structure 207 with an associated transaction ID (TX ID).

The client address field 302 holds data that indicates an address of the UE 101 learned from the buy request message and thus indicates where the message 300 is directed. For example, the client address field 302 holds an IP address and is included in a header portion of the IP layer.

The TX ID field 304 holds data that indicates the transaction identifier defined based on the buy request message, described above.

The authentication URL field 306 holds data that indicates where an HTTP message from the client (e.g., commercial client 131) is to be directed to determine a subscriber number for the user, according to the HTTP URL method for identifying the user to the operator billing system. For example, the URL indicates the back-end payment gateway 133 or the authentication recovery server 153.

The optional AP list field 307 holds data that indicates a client ordered list of access points, such as WAP access points, that are suitable for HTTP authentication to avoid HTTP authentication failure.

The merchant SMS address field 308 holds data that indicates a SMS address (telephone number or short code) of the merchant platform or a program running on the merchant platform. Short codes, also known as short numbers, are special telephone numbers, significantly shorter than full telephone numbers, which can also be used to address SMS and Multimedia Message Service (MMS) messages from mobile phones or 3G phones. The SMS address field 308 holds the address to which a SMS recovery message is directed, if useful. The optional SMS message field 309 holds text data that is to be included in the SMS payload of the SMS recovery message, if sent. In some embodiments the SMS message field 309 includes data that indicates the transaction, such as the product and amount or the transaction identifier (TX ID).

Figure 3C:
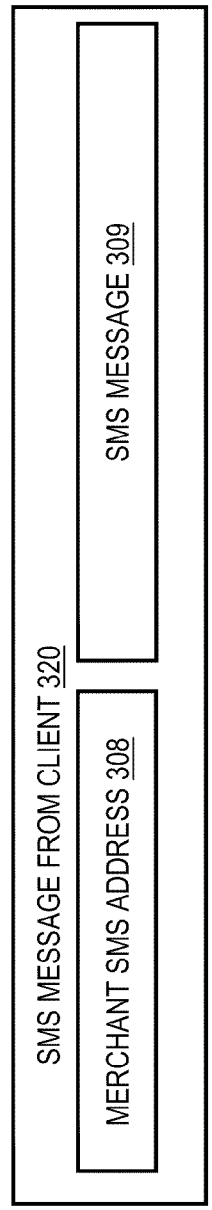
Figure 3D:
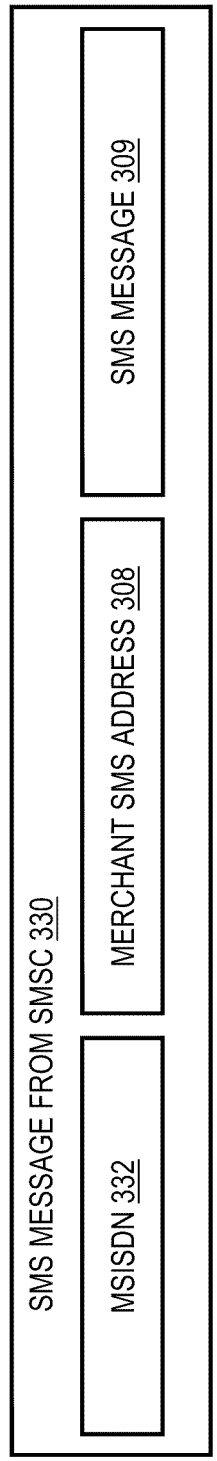
Figure 3E:
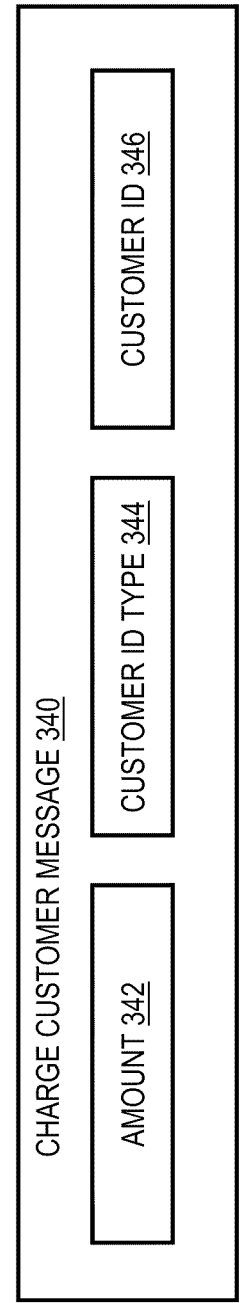

In response to receiving the buy response message 300, the commercial client 131 sends an HTTP GET message to the authentication URL which is forwarded by the access point 111 to the merchant platform as HTTP GET authentication message 310 from the operator network, depicted in FIG. 3C. The forwarded HTTP GET authentication message 310 includes the authentication URL field 306 as a destination in the HTTP header and the TX ID field 304 inserted by the commercial client 131. If the HTTP GET message is received at a WAP AP, e.g., WAP AP 111b, then the WAP AP inserts a customer ID into the message as values in a customer ID type field 314 and a customer ID field 316, e.g., in a header of the HTTP message, before forwarding the message 310 to the merchant platform. The customer ID type field 314 holds data that indicates the type of customer ID for specifying the user, e.g., whether the customer ID is a MSISDN, ISMI or some other type. The customer ID field 316 holds the value of that type of ID for the particular user. However, if the HTTP GET message is received at a non-WAP AP, e.g., WAP AP 111a, then fields 314 and 316 are omitted.

According to some embodiments, before sending the HTTP GET message, the commercial client checks what access point is currently being used for data connection; and determines if access point type is WAP AP. If not, then the commercial client terminates the current data connection and creates a new data connection using a WAP AP. In some embodiments, the determination whether the access point type is WAP AP is made using a lookup to a device access point database. In some embodiments, the determination whether the access point type is WAP AP is made using the WAP access points provided by a backend server, e.g., in field 307 of buy response message 300.

According to some embodiments, if the user does not receive authentication, e.g., as a valid access code for retrieving the product with a particular time interval, then the client sends an SMS recovery message, called herein a client SMS message 320 depicted in FIG. 3C. For example, the message 320 is sent from authentication recovery client 151 on UE 101. The SMS message from client 320 includes a merchant SMS address field 308 and, if available, the SMS message field 309, both from the buy response message 300. The SMS message field 309 includes data that indicates the transaction, such as the TX ID. The client SMS message is processed by the SMSC 117, which adds a customer ID, e.g., a MSISDN value, in MSISDN field 332 to form SMSC message 330. In some embodiments, the type of customer ID is known to all users of the network. In some embodiments, the type of customer ID is also provided in field 332.

This SMSC message 330 is received by the merchant platform backend, e.g., in authentication recovery server 153 or payment gateway 133. Once the merchant platform 130 is in possession of an identifier for the user that is also known by the operator, the information is used to form a charge customer message 340 depicted in FIG. 3E. The charge customer message 340 is sent from the merchant platform back end, e.g., payment gateway 133, to the operator billing system, e.g., operator billing system 115. The charge customer message 340 includes an amount field 342, a customer ID type field 344 and a customer ID field 346.

The amount field 342 holds data that indicates the purchase price (e.g., before taxes). This value can be obtained from the transaction content data structure 207 based on a TX ID value in the SMS message field 309, or can be included explicitly in the SMS message field 309.

The Customer ID type field 344 indicates the type of identifier used to specify the user, e.g., MSISDN or some other identifier utilized by the network operator. The Customer ID field 346 indicates the value of identifier used to specify the user, e.g., a MSISDN value or value for another ID type.

Although in FIG. 3A through FIG. 3E data fields are depicted as integral blocks in a particular order in certain messages, in other embodiments, one or more fields, or portions thereof, may be arranged in a different order in the same or more or fewer messages.

Figure 4:
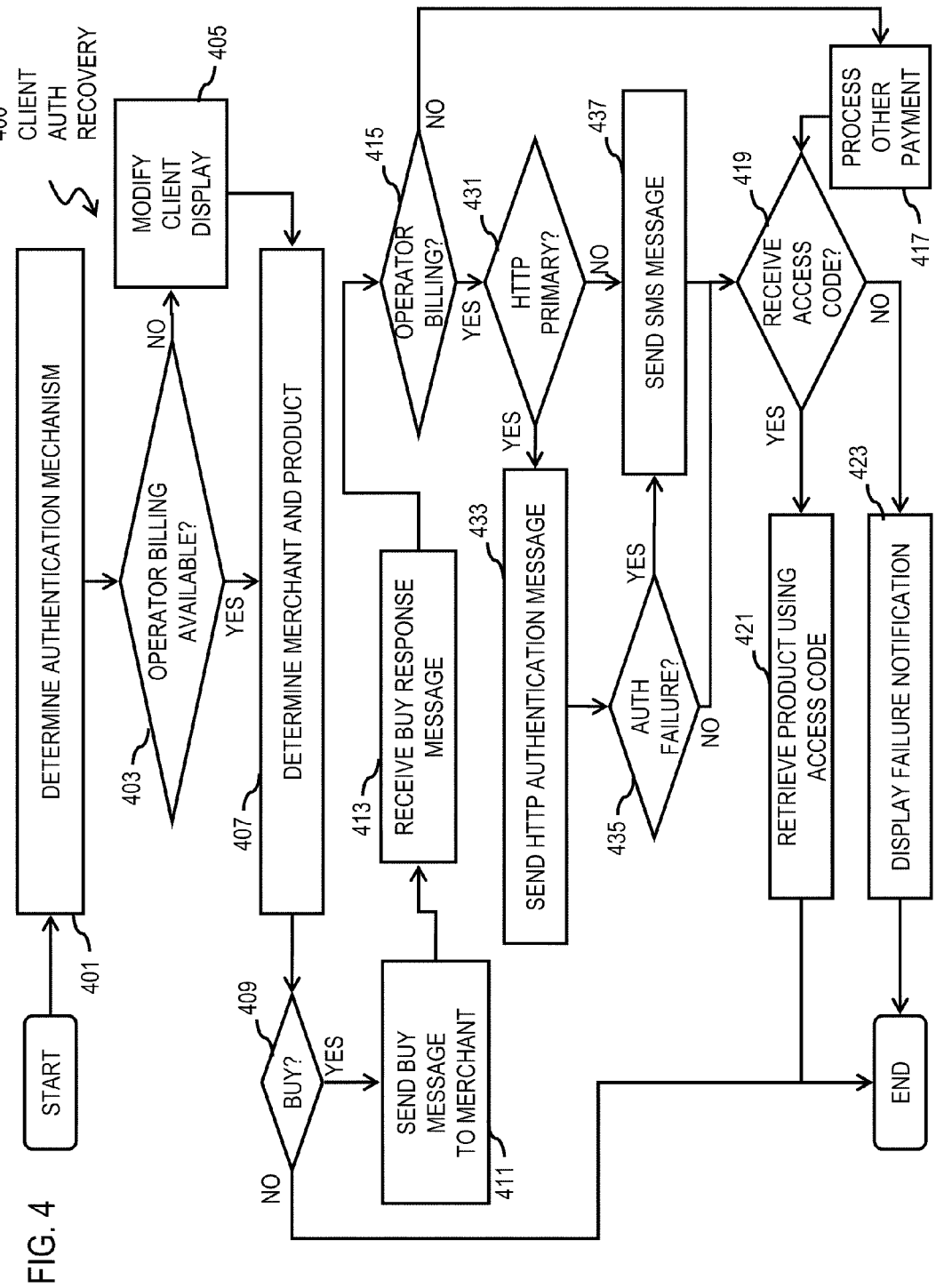
FIG. 4 is a flowchart of a client process for providing recovery during authentication for operator billing, according to one embodiment.
Figure 5:
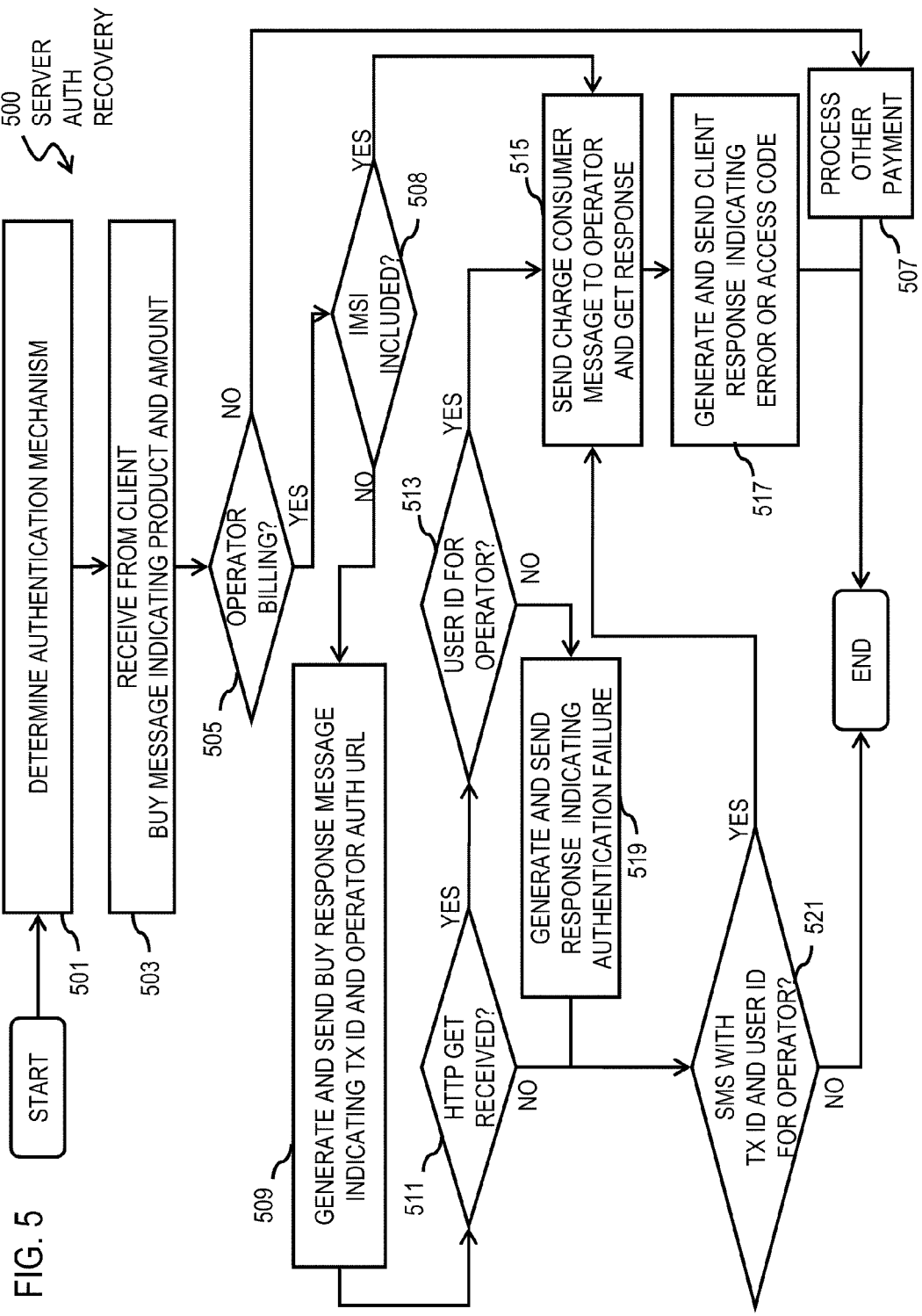
FIG. 5 is a flowchart of a server process for providing recovery during authentication for operator billing, according to one embodiment.

FIG. 4 is a flowchart of a client process 400 for providing recovery during authentication for operator billing, according to one embodiment. For example, steps 433, 435 and 437 are performed by the authentication recovery client 151, while the remaining steps are performed by the commercial client 131 that is similar to commercial clients used in previous approaches. In some embodiments, one or more steps of FIG. 400 are implemented in or initiated by, for instance, a chip set including a processor and a memory as shown FIG. 10. Although steps in FIG. 4 and subsequent flow chart FIG. 5 are shown in a particular order for purposes of illustration, in other embodiments, one or more steps may be performed in a different order or overlapping in time, in series or in parallel, or one or more steps may be omitted or added, or changed in some combination of ways.

In step 401, the available authentication mechanisms are determined. For example, authentication mechanisms can be configured dynamically by operator and UE type and version of commercial client. SMS authentication can be used as a recovery or primary authentication mechanism. For example, certain embodiments of commercial clients can use HTTP with SMS recovery, while other embodiments of commercial clients on different UE use SMS only or other recovery means, such as lists of approved WAP access points. In some embodiments it is determined whether operator billing is available at all, or other billing is available, such a credit card or other network payment services. In some embodiments, the available mechanisms are received as data. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

In step 403 it is determined whether operator billing is available. If not, then in step 405 a client display is modified to indicate operator billing is not available, e.g., by greying out a button to be selected to charge a purchase to a phone bill.

In step 407, a user operates the browser 103 to find a particular merchant platform that includes a product (i.e., item or service) of acceptable price to be purchased. In step 409 the client receives input that indicates whether the user determined to make the purchase, i.e., to buy the item or service. If so, then in step 411 a buy request message is sent to a merchant platform.

In step 413, in response to sending the buy request message, the commercial client, e.g., commercial client 131, receives a buy response message, such as modified buy response message 300. A standard buy response message includes the transaction identifier (TX ID) and authentication URL where an HTTP message should be sent by the client (e.g., commercial client 131) for HTTP authentication. The modified buy response message, according to some embodiments, includes the merchant SMS address field 308 and SMS message 309 (called hereinafter the SMS recovery fields) to be used during SMS recovery in case of HTTP authentication failure. In some embodiments, the modified buy response message includes the AP list field 207. In some embodiments, the authentication recovery client 151 extracts the SMS recovery fields and AP list field, if any, from the buy response message to use in an SMS recovery step 437 or the HTTP authentication step 433, both described below.

In step 415, it is determined whether operator billing is to be used, e.g., the user has selected an option to add the purchase to the user's phone bill. If not, then in step 417 another payment type is processed.

In step 419, it is determined whether an access code for the product has been received, e.g., a URL with credentials to download the product in an HTTP message from the merchant platform. If not, then in step 423 a notification of failure of the purchase is displayed on the UE. Example notifications are described in more detail below with reference to FIG. 8C. If the access code for the product has been received, then in step 421 the product is retrieved using the access code, as is well known in the art. In many embodiments, the HTTP response to the HTTP authentication message does not contain the access code. Instead, during step 419 in such embodiments, as is well known in the art, the commercial client 131 sends to the merchant node another message (not shown) that includes a query for the access code. This separate message may be sent using any protocol. A response (not shown) to this message with the query, in a corresponding protocol, includes data that indicates the access code.

If it is determined, in step 415 that operator billing is being utilized, then in step 431 it is determined whether HTTP authentication is the primary form of authentication. HTTP authentication is advantageous because it is quicker, consuming fewer network resources. If HTTP authentication is primary, then in step 433 the HTTP GET is sent to the URL received in the buy response message, e.g., the URL of a process on the merchant platform 130. In some embodiments, before sending the HTTP GET message, the authentication recovery client changes an access point to the network until an access point utilized is on a list of acceptable access points, e.g., is indicated in AP list 207.

In step 435, it is determined whether there has been an authentication failure, e.g., by determining that an HTTP message with an access code has not been received within a particular time; or, sending a status request to the URL and receiving a status response indicating authentication failure. If there is not authentication failure, then control passes to step 419 and subsequent steps described above, to retrieve the product or display failure notifications.

If there is authentication failure, or if it is determined in step 415 that HTTP is not the primary form of authentication, then in step 437 a SMS message is sent to the merchant SMS address with the SMS message indicating the transaction, e.g., by sending message 320 depicted in FIG. 3C. Recall that the SMS address and SMS message were received in the modified buy response message 300 depicted in FIG. 3A. Then control passes to step 419, and following steps, described above. In an illustrated embodiment, steps 435 and 437 are performed by authentication recovery client 151.

In some embodiments, step 437 includes a value of an IMSI identifier, e.g., read from a SIM card on the UE. In some embodiments, the IMSI value is included in the buy message sent in step 411, which pre-empts further authentication, so that steps 431, 433, 435 and 437 are omitted. For example, the commercial client reads IMSI from the SIM card in the UE 101 and initiates payment by browsing or calling the merchant ecommerce platform 130.

As described above, a user's subscriber ID is added to HTTP headers only if the user is using GPRS/3G access point. Depending on the operator, only some of the GPRS access points adds the user's subscriber ID and therefore only some work for authentication. To avoid billing failures, some embodiments use SMS as backup authentication mechanism for HTTP authentication. It is advantageous if shortcode that is used in SMS address field for SMS authentication recovery is zero rated in an agreement with the operator, so that commercial client 131 can safely send SMS messages 320 without asking permission from the user and thus diminishing the user experience.

FIG. 5 is a flowchart of a server process 500 for providing recovery during authentication for operator billing, according to one embodiment. For example, steps 509, 519 and 521 are performed by the authentication recovery server 153, while the remaining steps are performed by other elements of the merchant platform 130 for a particular merchant. In some embodiments, one or more steps of FIG. 500 are implemented in or initiated by, for instance, a chip set including a processor and a memory as shown FIG. 10.

In step 501, the authentication mechanisms to be used by the merchant platform 130 with commercial clients running on different user devices are determined, as described above for step 401.

In step 503, a buy request message is received from a commercial client 131 on a particular user device, e.g., UE 101. As described above with respect to step 411, the buy request message includes data that indicates a particular product of the merchant and an amount for that product, as well as the user device network address and the network operator to which the user subscribes for network service. Step 503 includes actions by the transaction module 205 to form a transaction record that is stored in the transaction content data structure 207 in association with a transaction identifier (TX ID) that is unique at the merchant platform 130. The transaction record includes information that indicates one or more attributes each for the product, the amount, the user, and the operator network for the user, as is well known in the art.

In step 505 it is determined whether operator billing is to be used to pay for the product. Any method may be used to determine this. In some embodiments, operator billing is the default payment process. In some embodiments, the step 505 includes exchanging one or more messages with the commercial client 131 on the user device, e.g., through the online purchase UI process 135, to determine if the user has opted for operator billing. An example UI displayed on the user device to receive user input is described in more detail below with reference to FIG. 8A through FIG. 8C. In some embodiments, such a UI is presented by the commercial client 131 inserted in the user's browser 103 by the online purchase UI process 135, as is well known in the art. If operator billing is not chosen, then in step 507, payment is obtained by processing another payment type, not relevant to the operator authentication embodiments described herein.

If it is determined, in step 505, that operator billing is to be used, then in step 508 it is determined whether the buy request message included an IMSI value as a user identifier. If so, then there is sufficient information for operator billing starting in step 515, as described in more detail below. If not, then user authentication is still to be performed; and control passes to step 509.

In step 509, a modified buy response message is generated and sent to the user's device, e.g., to UE 101. As described above, the modified buy response message includes a transaction identifier (TX ID) field and authentication URL for a HTTP message, as in previous approaches. To provide for recovery, the modified buy response message is generated to include also an SMS address for the merchant platform as a full telephone number, or as a short code, in merchant SMS address field 308. In some embodiments, the TX ID is included in the SMS message sent during recovery. In other embodiments, other information is desirable and included in the SMS message. Thus, in some embodiments the buy response message also includes the SMS message field 309 that holds the contents of the SMS message to be sent to the merchant SMS address during recovery from authentication failure. For example, the SMS recovery fields 308 and 309 are inserted into the buy response message 300 by the authentication recovery server 153. In some embodiments, field 307 is inserted and includes a list of approved access points, such as WAP access points, in addition to or instead of inserting the SMS recovery fields.

In step 511 it is determined whether an HTTP GET message is received at the authentication URL on merchant platform, e.g., by the payment gateway 133. If so, then in step 513 it is determined if the HTTP GET message includes for the user a customer identifier (C ID) which is provided by the operator, e.g., in an HTTP header portion of the message. If so, then there is sufficient information for operator billing starting in step 515.

In step 515 a charge customer message is sent to the operator with the C ID and the purchase amount and any text to identify the transaction in the bill presented to the user by the operator. For example, charge customer message 340 is sent with a purchase price in the amount field 342, a customer ID type indicating MSISDN or IMSI or other type in field 344, and the value of the MSISDN or IMSI or other type identifier in customer ID field 346. Step 515 includes receiving any response from the operator, including an approval with an amount of tax to apply or data indicating an error, such as a failure due to insufficient balance or inactive account.

In step 517 a response is generated and sent to the client indicating a successful billing and amount or indicating an error. In the event of a successful billing, the response includes an access code, such as a URL and credentials to obtain the product at a website. Any method known in the art may be used to send this response. In some embodiments, the response is sent automatically to the client, e.g., as an HTTP message. In some embodiments, the response is sent in response to a status inquiry message from the client.

If it is determined in step 513, however, that the HTTP GET message received in step 511 does not include for the user a C ID provided by the operator, then in step 519 a response is generated and sent to the client indicating authentication failure. Any method known in the art may be used to send this response. In some embodiments, the response is sent automatically to the client, e.g., as an HTTP message. In some embodiments, the response is sent in response to a status inquiry message from the client. In some embodiments step 519 is omitted.

If the HTTP message received from the client in step 511 does not have a C ID supplied by the operator (e.g., because the UE 101 connects to network 105 through a non-WAP access point 111a), or if an HTTP message is not received from the client, then in step 521 it is determined whether an SMS message is received with a transaction identifier and a user ID for the operator, such as a value for a MSISDN or other identifier. If not, then authentication fails. If such an SMS message is received, for example if SMSC message 330 is received, then there is sufficient information for operator billing; and control passes to step 515 and following steps, as described above. For example, authentication recovery server 153 extracts, from the SMSC message 330, the user ID from the MSISDN field 332 included in the SMS header and the TX ID and any other desired information from the SMS message field 309.

Figure 6A:
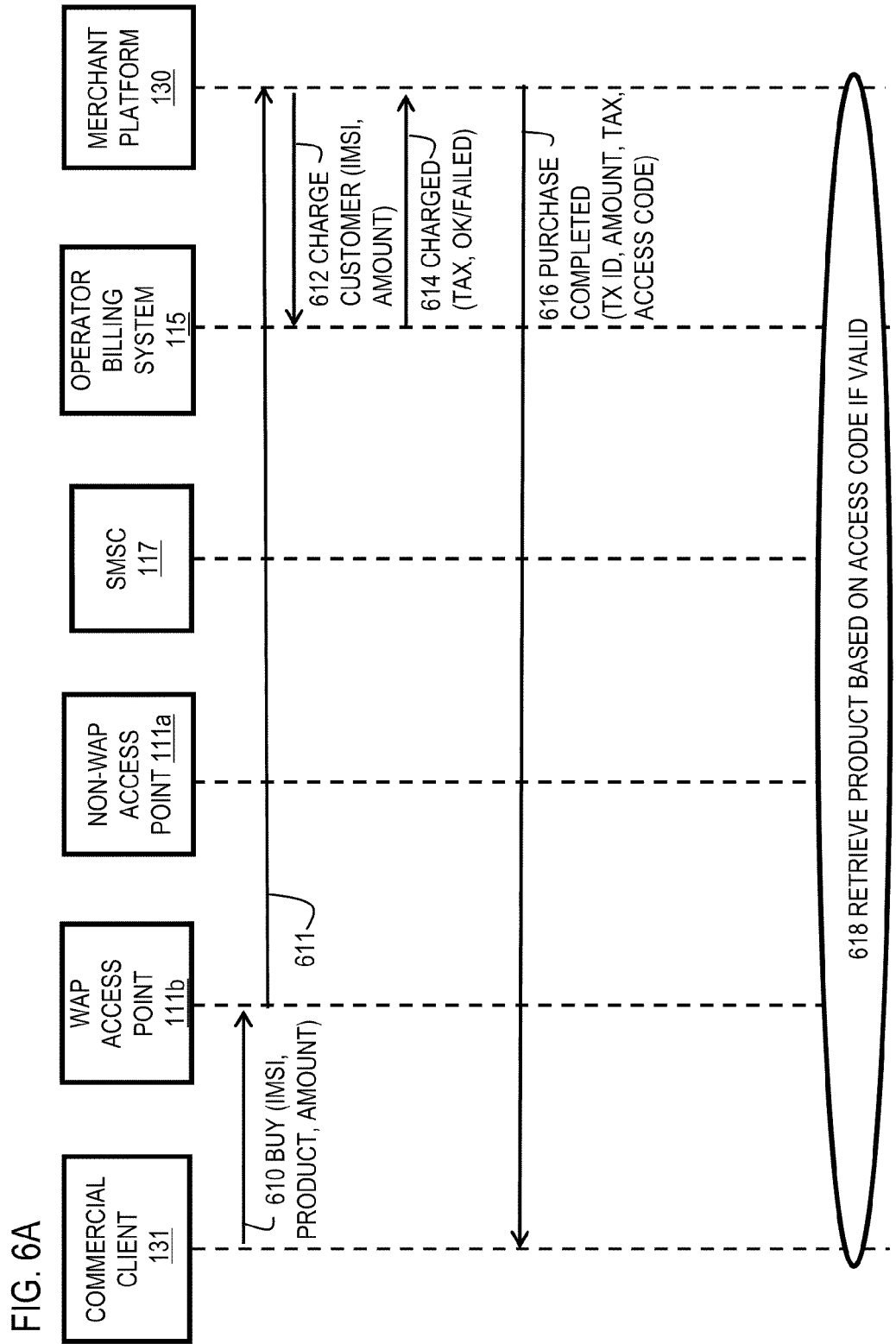
FIG. 6A and FIG. 6B are time sequence diagrams of messages exchanged for primary authentication for operator billing, according to some embodiments.
Figure 6B:
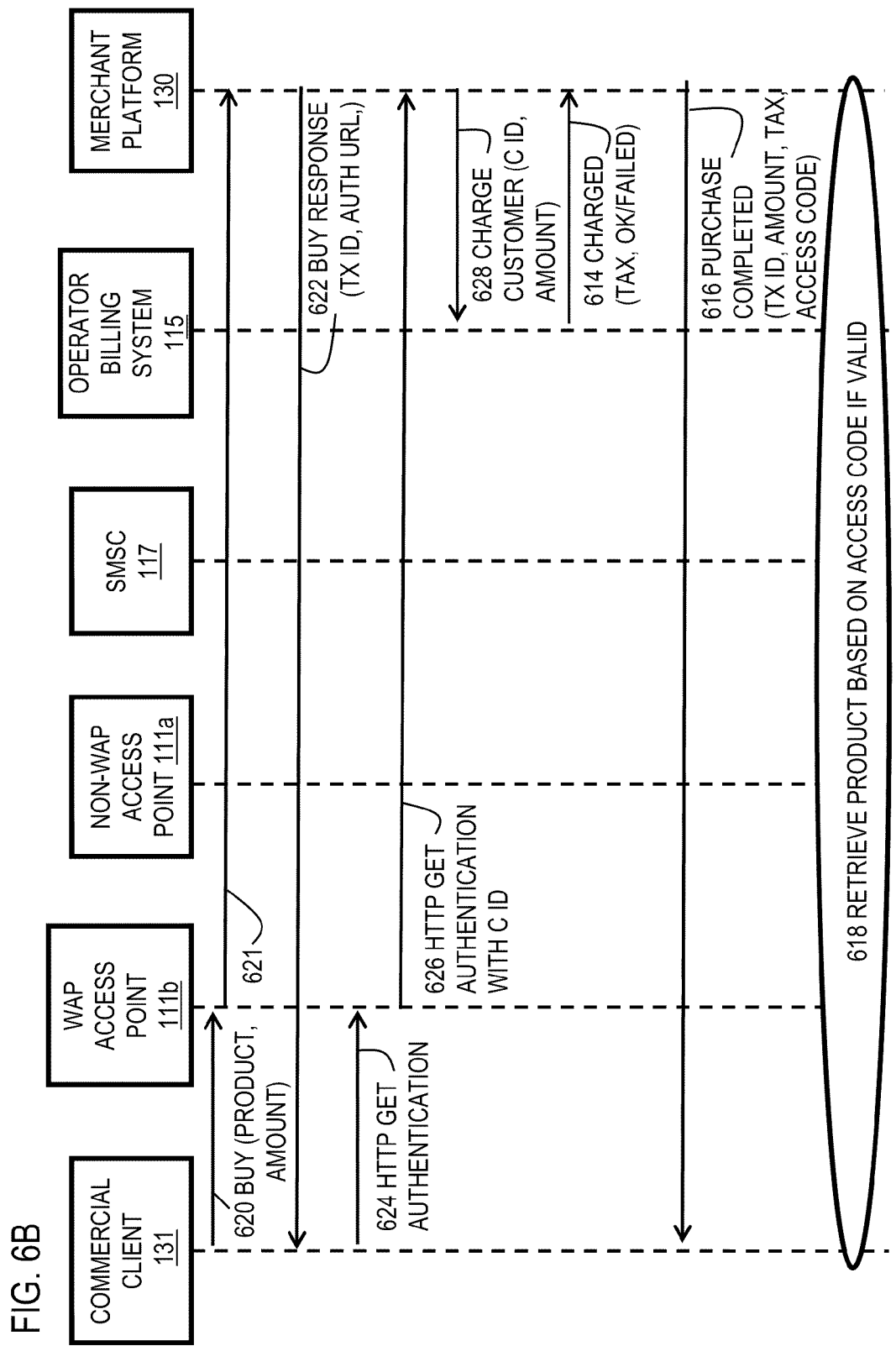

FIG. 6A and FIG. 6B are time sequence diagrams of messages exchanged for primary authentication for operator billing, according to some embodiments. In time sequence diagrams, time increases downward, network processes or nodes are indicated by vertical bars labeled at the top, and messages are shown as arrows extending from a sending process/node to the receiving process/node. To better show similarities and differences, all time sequence diagrams show the same six processes/nodes: the commercial client 131, the WAP access point 111b, the non-WAP access point 111a, the SMSC 117, the operator billing system 115, and the merchant platform 130.

FIG. 6A shows the message sequence for IMSI authentication that is possible for some user equipment with SIM cards. In these embodiments, the buy request message 610 includes a product identifier, a purchase amount and an IMSI value from the local SIM card on the UE. This message can be formatted according to any protocol, is received by a WAP access point 111b or non-WAP access point 111a and forwarded as message 611 to the merchant platform 130. The purchase can go forward with the IMSI identifier value supplied explicitly in the buy request message.

A process on the merchant platform, e.g., payment gateway 133, sends a charge customer message 612, like charge customer message 340, to the operator billing system (e.g., operator billing system 115) with an amount in field 342, a customer ID type field 344 holding data that indicates IMSI, and a customer ID field 346 holding data that indicates the value of the IMSI identifier. In the illustrated embodiment, IMSI is used directly in billing request to operator billing system. In other embodiments, if IMSI cannot be used directly, the IMSI is used to lookup MSISDN or other identifier type that is allowed in the operator billing system.

A charged message 614 is returned from the operator billing system, as is well known in the art. This charged message 614 indicates a tax amount if the charge is OK or data indicating a failure of some type, e.g., account closed or insufficient funds. A purchase completed message 616 is returned to the commercial client, e.g., commercial client 131, as is well known in the art. If unsuccessful, an example purchase completed message indicates the transaction identifier (TX ID), the amount of purchase, and data that indicates the failure, such as an error code with or without additional expository text. If successful, an example purchase completed message indicates the transaction identifier (TX ID), the amount of purchase, the amount of tax, and an access code for retrieving the purchased product (item or service), such as a URL with any credentials to download a file from a particular World Wide Web (WWW) site. Subsequent messages 618 represent retrieval of the product based on the access code, if a valid access code is provided, as is well known in the art.

FIG. 6B shows the message sequence for successful HTTP authentication. HTTP authentication is desirable for many users and merchants because it is a fast authentication, involving few network resources. In these embodiments, the buy request message 620 includes a product identifier and a purchase amount but no user identifier known to the operator. This message can be formatted according to any protocol, and is received by a WAP access point 111b or non-WAP access point 111a and forwarded as message 621 to the merchant platform 130.

A process on the merchant platform, e.g., online purchase UI 135, sends a buy response message 622 using the same protocol as the buy request message 620. The buy response message 622 includes data indicating the transaction identifier (TX ID) and the authentication URL to which the client 131 should send an HTTP message to complete HTTP authentication. In a standard approach, the buy response message 622 does not include the SMS recovery fields 308 or 309 or AP list field 307 of modified buy response message 300.

In response to receiving the buy response message 622, the client 131 sends an HTTP GET authentication message 624 directed to the authentication URL provided in message 622. To avoid failure, this message should be received at a WAP access point 111b. The WAP access point 111b adds a user identifier (customer ID, C ID) known by the operator, such as a MSISDN identifier, to the HTTP header to form message 626. The HTTP header now includes the C ID, which comprises the type of user ID (e.g., MSISDN) and the value. The WAP access point 111b forwards the message 626 to the merchant platform 130.

A process on the merchant platform, e.g., payment gateway 133, sends a charge customer message 628, like charge customer message 340, to the operator billing system (e.g., operator billing system 115) with an amount in field 342, a customer ID type field 344 holding data that indicates the type (e.g., MSISDN) of the C ID and a customer ID field 346 holding data that indicates the value of the identifier of that type. Messages 614, 616 and 618 are as described above.

If the HTTP GET authentication message 624 is not received by a WAP access point 111b, (e.g., is received by a WiFi access point or Internet access point represented by non-WAP access point 111a), then there is a danger the forwarded message will not include in the HTTP header a user identifier (C ID) known by the operator. Then the authentication process fails; and messages 628, 614, 616 and 618 depicted in FIG. 6B are not sent.

Figure 7A:
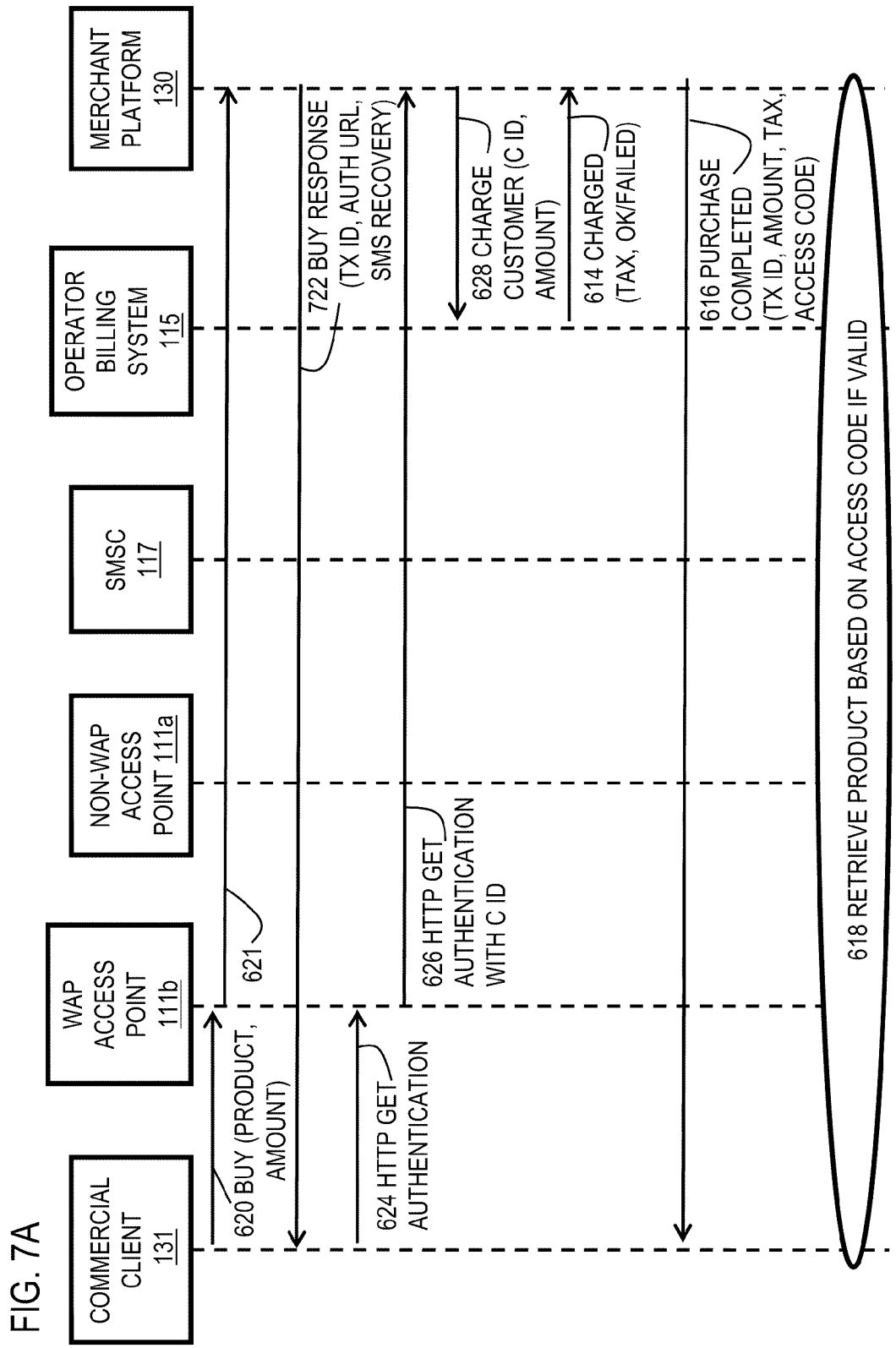
FIG. 7A and FIG. 7B are time sequence diagrams of messages exchanged for recovery authentication for operator billing, according to an embodiment.
Figure 7B:
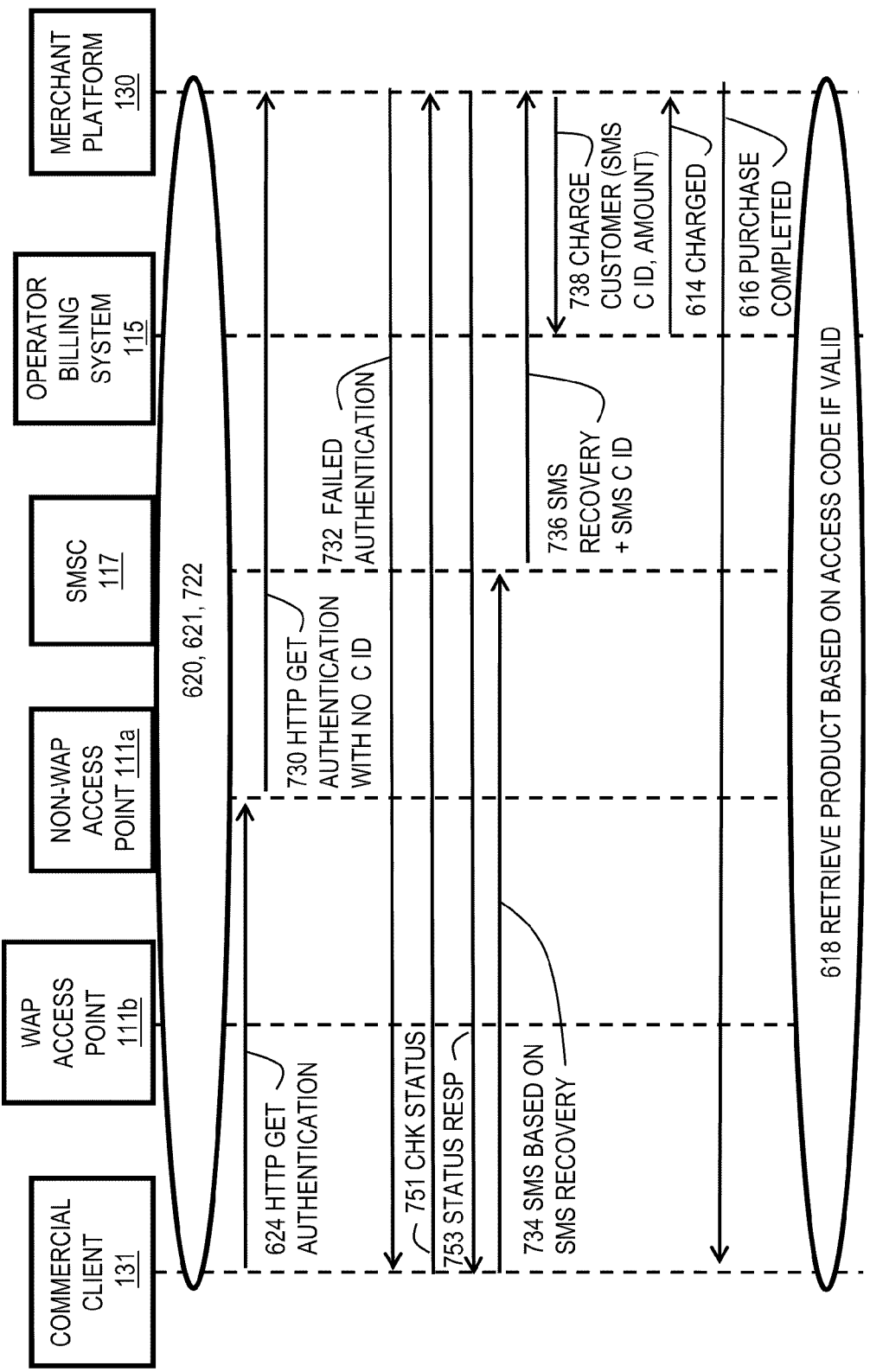

FIG. 7A and FIG. 7B are time sequence diagrams of messages exchanged for recovery authentication for operator billing, according to an embodiment.

FIG. 7A shows the message sequence for successful HTTP authentication according to an embodiment. As in FIG. 6B, the buy request message 620 includes a product identifier and a purchase amount but no user identifier known to the operator. This message can be formatted according to any protocol, and is received by a WAP access point 111b or non-WAP access point 111a and forwarded as message 621 to the merchant platform 130.

A process on the merchant platform, e.g., authentication recovery server 153, sends a modified buy response message 722, such as modified buy response message 300. In addition to the fields described above for message 622, modified buy response message 722 includes one or both SMS recovery fields 308 and 309. In some embodiments, the modified buy response message includes the AP list field 307.

In response to receiving the modified buy response message 722, the client 131 sends an HTTP GET authentication message 624 directed to the authentication URL provided in message 722, while the authentication recovery client 151 extracts the SMS recovery field 308 and, if included, field 309 or field 207 or both. When message 624 is received at a WAP access point 111b, as shown, the remaining messages are the same depicted in FIG. 6B. The WAP access point 111b adds a user identifier (C ID) known by the operator, such as a MSISDN identifier, to the HTTP header to form message 626. A process on the merchant platform, e.g., payment gateway 133, sends a charge customer message 612 to the operator billing system, and messages 614, 616 and 618 are as described above.

In some embodiments, the merchant platform 130 provides a client ordered list of access points that are suitable for HTTP authentication to avoid HTTP authentication failure, e.g., in AP list field 307. If the commercial client 131 or authentication recovery client 151 detects that a current data connection is using some other access point, the client will try to terminate the current connection and create a new one using access points suggested by the merchant platform in field 307. Multiple attempts can be made if there are many access points provided by merchant platform 130.

FIG. 7B shows the message sequence for unsuccessful HTTP authentication according to an embodiment. Messages 620, 621, 722 and messages 614, 616 and 618 are as described above.

In response to receiving the modified buy response message 722, the client 131 sends an HTTP GET authentication message 624 directed to the authentication URL provided in message 722, while the authentication recovery client 151 extracts the SMS recovery field 308 and, if included, field 309 or field 307 or both. When message 624 is received at a non-WAP access point 111a, however, as shown, the non-WAP access point 111b might not add a user identifier (C ID) known by the operator, such as a MSISDN identifier, to the HTTP header. HTTP GET message 730 with no C ID is forwarded to the authentication URL on merchant platform 130. A process on the merchant platform, e.g., payment gateway 133, does not authenticate the user and cannot issue a charge customer message. Instead a message indicating failed authentication is sent to the client, either automatically as a HTTP response 732 to the HTTP GET, or in response to a status inquiry message from the client 131. In an example of the latter embodiments, HTTP GET message 624 just returns HTTP OK message 732. Subsequently, the commercial client 131 automatically requests payment status with a separate call that sends a check status message 751. Authentication failure is provided as response to that call in status response message 753.

Upon determination of HTTP authentication failure, a process in the commercial client, e.g., authentication recovery client 151, sends an SMS message 734 directed to the SMS address of the merchant platform 130, as received in field 308 of modified buy response message 722. In some embodiments, the payload of the SMS message includes the TX ID from field 304 of the modified buy response message 300. In some embodiments, the payload of the SMS message includes the data in the SMS message field 309 of the modified buy response message 300.

The SMS message 734 is processed at the SMSC node 117 of the operator network, where a customer identifier (C ID) known by the operator for the user, such as a MSISDN identifier, is added to the header of the client SMS message to form the SMSC message 330 from the SMSC. The SMSC message is forwarded as message 736, which includes the SMS recovery fields and the SMS C ID (e.g., MSISDN).

A process on the merchant platform, e.g., authentication recovery server 153, extracts the SMS C ID and transaction identifier from the SMS message 736, e.g. for use by the payment gateway 133. The payment gateway 133 sends a charge customer message 738, like charge customer message 340, to the operator billing system (e.g., operator billing system 115) with an amount in field 342, a customer ID type field 344 holding data that indicates the type (e.g., MSISDN) of the C ID in the SMS header and a customer ID field 346 holding data that indicates the value of the identifier of that type from the SMS header. Messages 614, 616 and 618 are as described above.

Figure 8C:
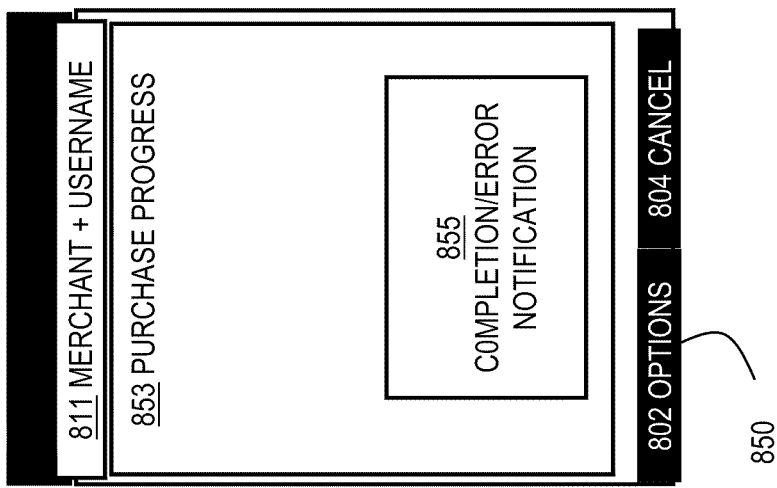
FIG. 8A through FIG. 8C are diagrams of user interfaces utilized in the processes of FIG. 4, according to various embodiments.
Figure 8B:
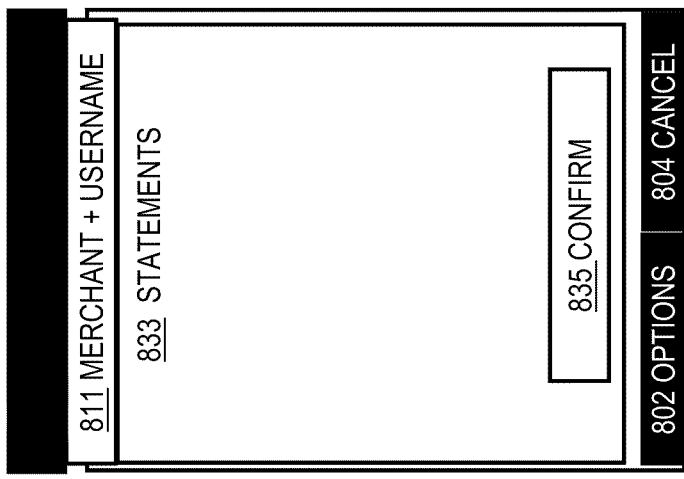
Figure 8A:
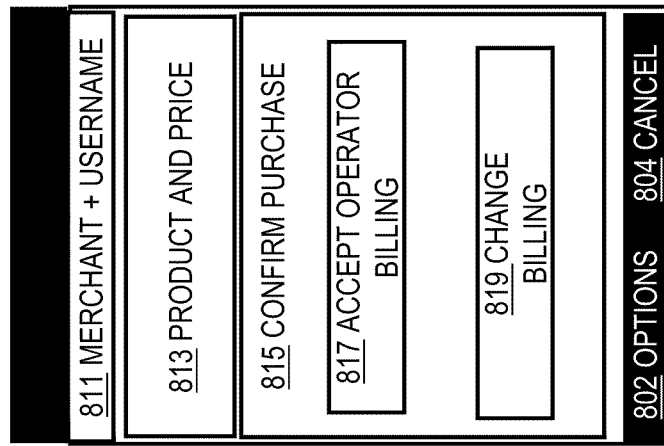

FIG. 8A through FIG. 8C are diagrams of user interfaces utilized in the processes of FIG. 4, according to various embodiments. In step 415 of FIG. 4, it is determined whether to perform operator billing. FIG. 8A shows a user interface screen 810 presented on a display of UE, such as UE 101. User interface screen 810 includes a top panel 811, a product panel 813, a purchase panel 815 and labels 802 and 804 for programmable keys on the UE. Label 802 for a left programmable key indicates a menu of options will be presented if the left programmable key is pressed by the user. Label 804 for a right programmable key indicates the presented action is canceled if the right programmable key is pressed by the user.

The top panel 811 presents an image that indicates the user name of the user of the device and a name of a merchant from which a product has been selected. The product panel 813 presents an image that indicates the product selected and the purchase price for the product. In some embodiments, the panel 813 includes a picture of the product.

The purchase panel 815 presents an image that indicates possible actions to confirm the purchase of the product and selectable active areas 817 and 819 that determine the next action to be performed by the user equipment. The Accept Operator Billing area 817 is selected by the user (e.g., by moving pointer keys to highlight the area and then pressing a select key) to cause the client to perform operator billing in order to pay for the product identified in panel 813. The Change Billing area 819 is selected to be presented with other options for paying for the product. In step 405, the Accept Operator Billing area is modified (e.g., made grey) to indicate it cannot be selected, if it is determined in step 403 that operator billing is not available for this user or this user equipment (UE).

If the Accept Operator Billing area is selected, then user interface screen 830 depicted in FIG. 8B is presented on a display of the UE. User interface screen 830 includes a top panel 811 and labels 802 and 804 for programmable keys on the UE, as described above, and a statements panel 833. The statements panel 833 presents an image that describes the legal and business implications of operator billing and includes selectable active area 835. For example, in some embodiments, the statements recite the following or similar words: "To finalize the purchase, you have to confirm that you are at least 18 years old or have parental permission;" or "Please note that the price of the service will not include the price of data traffic with your mobile device;" or "You will find the payments recorded on your subscription phone bill or subtracted from your pre-paid balance," among others, alone or some combination. The Confirm area 835 is selected to indicate that the user agrees with the statements presented and allows the client to proceed with operator billing.

If the Confirm area is selected, then user interface screen 850 depicted in FIG. 8C is presented on a display of the UE. User interface screen 850 includes a top panel 811 and labels 802 and 804 for programmable keys on the UE, as described above, and a purchase progress panel 853. The purchase progress panel 853 presents an image that describes the progress of the purchase and includes notification window 855. For example, the purchase progress panel displays a statement indicating "Purchase in progress, confirming payment" during steps 431, 433, 435, 437 and 419 and an animated icon indicating the progress, such as an hourglass, dots arranged along a circle that appear and fade in succession, or a progress bar, among others, alone or in some combination. In some embodiments, the actual authentication failure and recovery are hidden from the user.

Upon completing step 419 the user is notified of success or failure in the notification window 855. For example, during step 421 when the product is being retrieved, the window 855 recites the following or similar words: "Payment completed. Your receipt has been sent to [email address]." In some embodiments, the window 855 includes an animated icon indicating the progress of the retrieval during step 421. If, instead, the process fails, then notification window 855 recites one or more of the following error messages or similar messages, alone or in some combination.

"Phone bill payment error. We are experiencing problems with the Phone bill payment service. Please try again later."

""Low balance. You have not been charged. At the moment your prepaid balance is too low to complete this purchase. The purchase is cancelled and you will be taken back to the catalogue page."

"Spending limit exceeded. You have not been charged. The purchase exceeds the spending limit set to your account. Please contact your operator."

"Account locked. You have not been charged. Your account is locked. Please contact your operator."

"Bandwidth limit exceeded. You have not been charged. The bandwidth limit set to your account has been reached. Please contact your operator."

"Product not eligible. You have not been charged. The product is not eligible for purchase through this account. The purchase is cancelled and you will be taken back to the catalogue page."

"Payment confirmation failed. You have not been charged. Payment confirmation failed. Please check if the correct connection access point is selected in the settings of your phone or contact your operator." In some embodiments, the SMS authentication recovery described herein prevents an error message of this type.

The processes described herein for providing recovery during authentication for operator billing may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
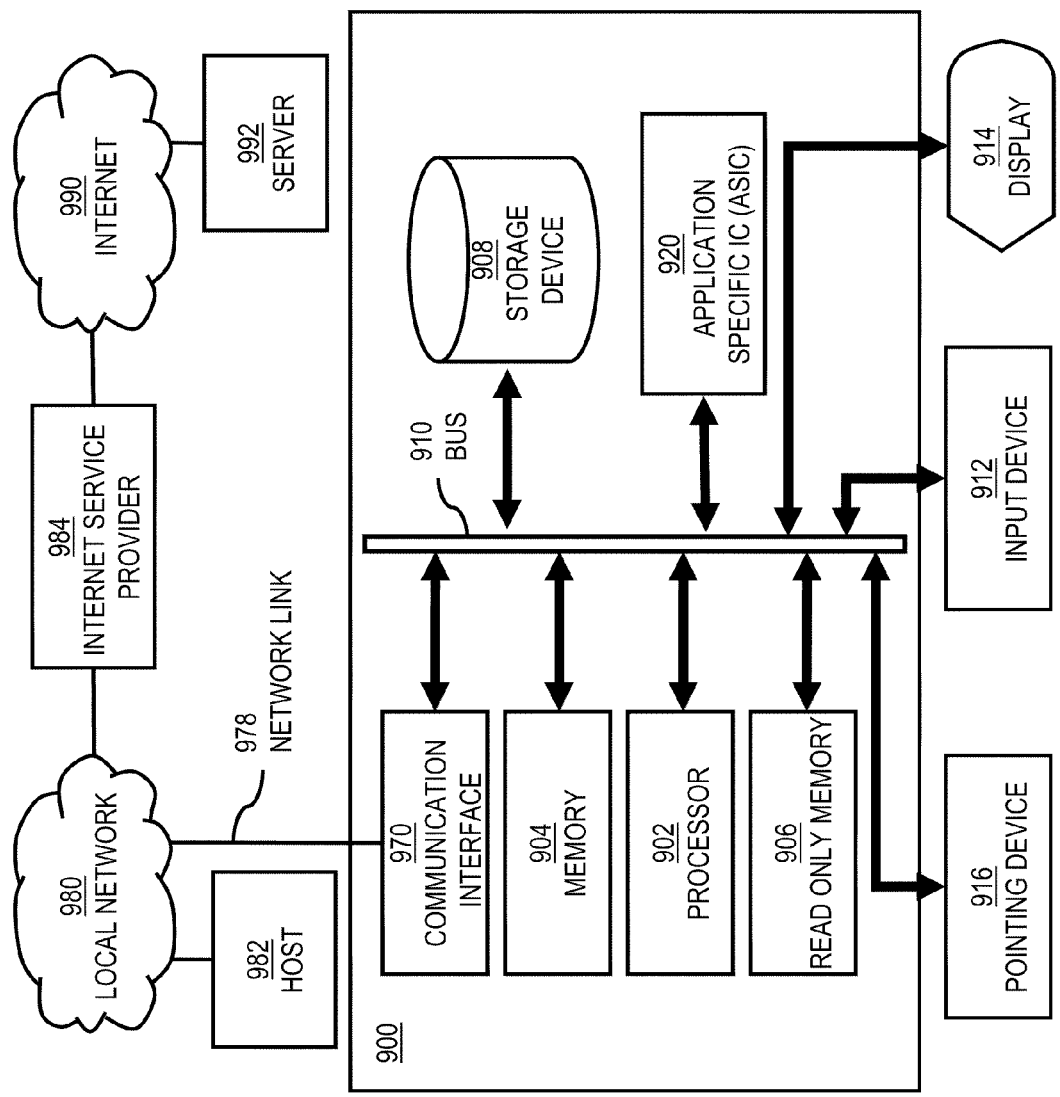
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide recovery during authentication for operator billing as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing recovery during authentication for operator billing.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to recovery during authentication for operator billing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for recovery during authentication for operator billing. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for recovery during authentication for operator billing, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for recovery during authentication for operator billing to the UE 101.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
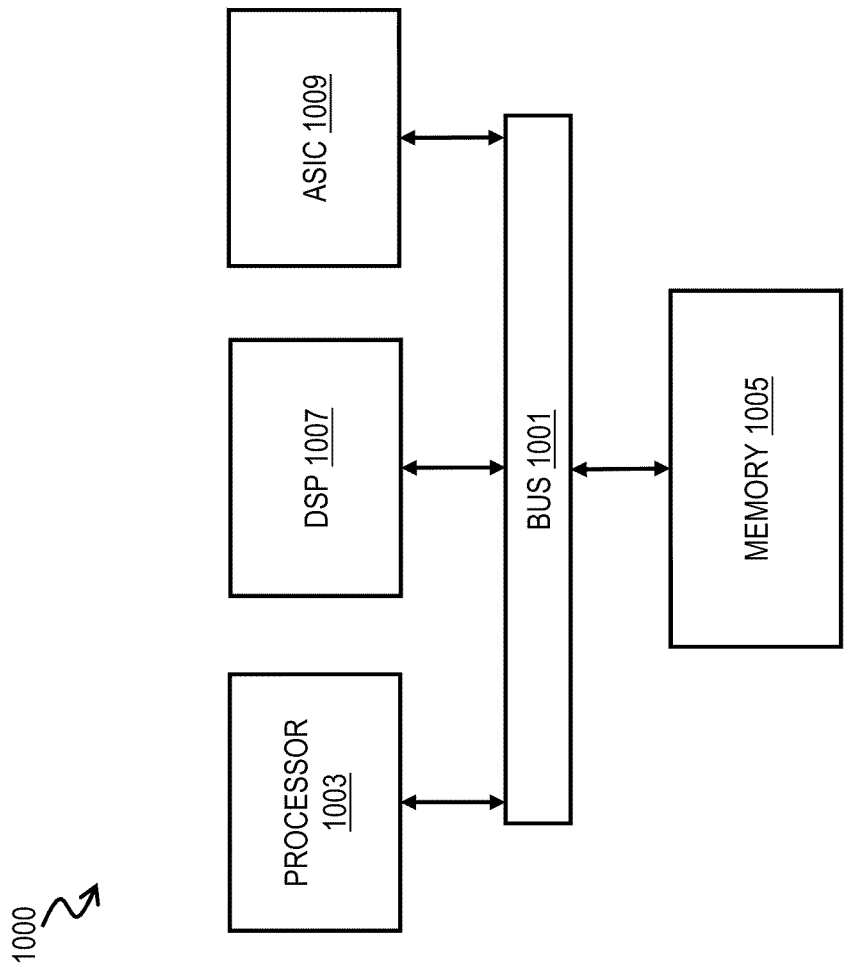
FIG. 10 is a diagram of a chip set that can be used to implement an embodiment of the invention.

FIG. 10 illustrates a chip set 1000 upon which an embodiment of the invention may be implemented. Chip set 1000 is programmed to provide recovery during authentication for operator billing as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of recovery during authentication for operator billing.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide recovery during authentication for operator billing. The memory 1005 also stores the data associated with or generated by the execution of the inventive steps.

Figure 11:
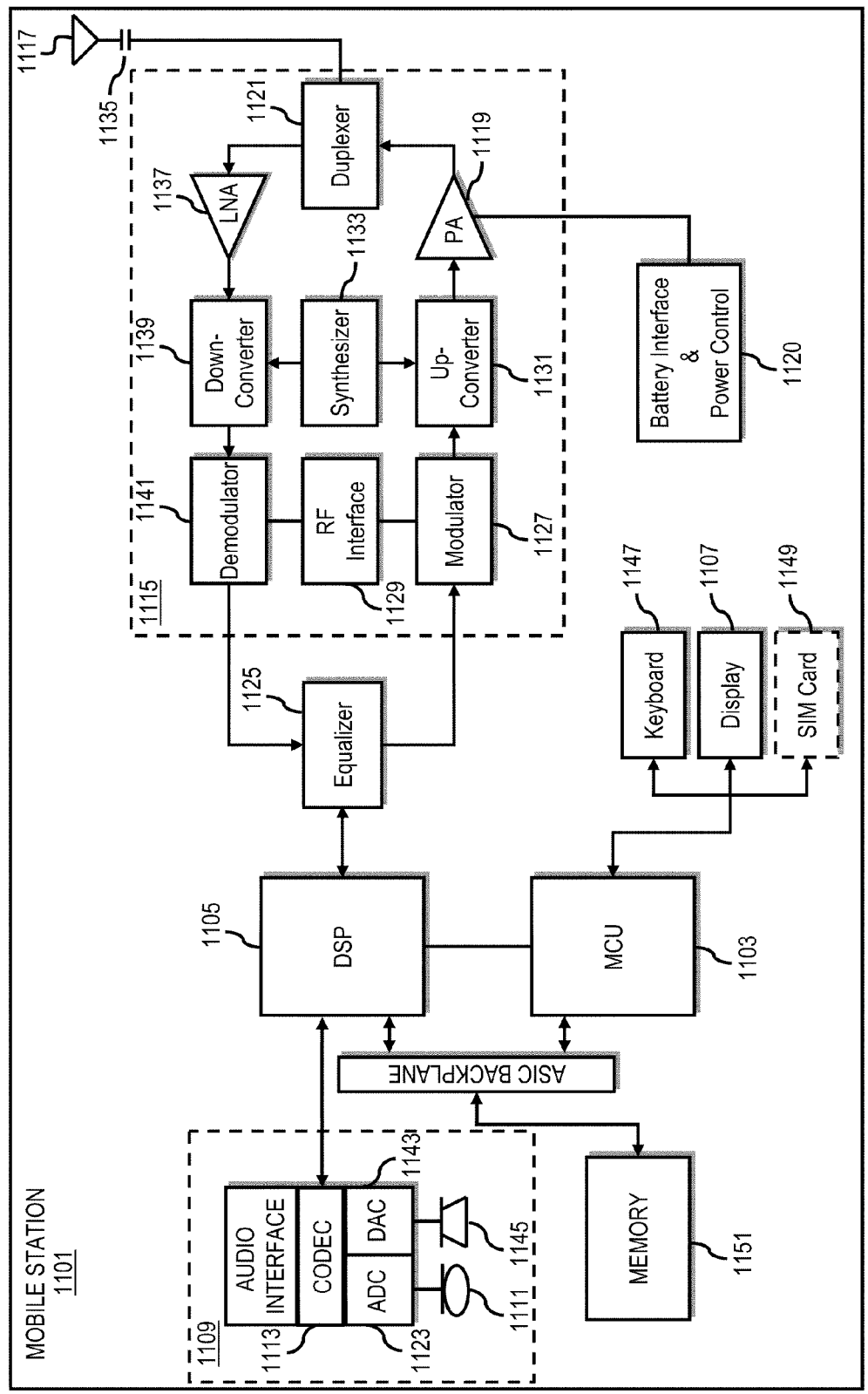
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of recovery during authentication for operator billing. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of recovery during authentication for operator billing. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide recovery during authentication for operator billing. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   in response to a buy request message from a user equipment, transmitting, by a merchant platform, a buy response message to the user equipment, wherein the buy response message includes a transaction identifier of a transaction between a user of the user equipment and a merchant, an uniform resource identifier for hypertext transfer protocol authentication, and a short message service address of the merchant;
   receiving, by the merchant platform from the user equipment via a network, a hypertext transfer protocol authentication message using the uniform resource identifier, wherein the hypertext transfer protocol authentication message includes the transaction identifier;
   determining, by the merchant platform, that authentication using the hypertext transfer protocol authentication message has failed;
   in response to the determination, transmitting, by the merchant platform, an authentication failure message to the user equipment;
   receiving, by the merchant platform from the user equipment, a short message service message using the short message service address, wherein the short message service message includes a network service subscriber identifier of the user equipment and the transaction identifier;
   authenticating the user, by the merchant platform, using the short message service message; and
   transmitting, by the merchant platform, a charge customer message to a network operator of the user for billing the transaction on behalf of the merchant, wherein the charge customer message includes an amount of the transaction and the network service subscriber identifier.

2. A method of claim 1, further comprising:
   determining by the apparatus to use the network operator to bill the transaction for the merchant,
   wherein the network operator provides access to the network for the user equipment.

3. A method of claim 1, further comprising:
   transmitting to the user equipment a message that indicates an access code for a product to be delivered by the merchant according to the transaction in response to the short message service message.

4. A method of claim 1, wherein the buy response message further comprises short message service recovery data.

5. A method of claim 1, wherein the network service subscriber identifier of the user equipment include an international mobile subscriber identity, a mobile station international subscriber directory number, or a combination thereof.

6. A method of claim 1, wherein the short message service message is sent from the user equipment without asking permission from the user.

7. An apparatus comprising:
   at least one processor; and
   at least one memory including computer program code for one or more programs,
   the at least one memory and the computer program code configured to, with the at least one processor, cause the apparatus embedded in a merchant platform to perform at least the following,
   in response to a buy request message from a user equipment, cause a transmission of a buy response message from the merchant platform to the user equipment, wherein the buy response message includes a transaction identifier of a transaction between a user of the user equipment and a merchant, an uniform resource identifier for hypertext transfer protocol authentication, and a short message service address of the merchant;

receive, from the user equipment via a network, a hypertext transfer protocol authentication message using the uniform resource identifier, wherein the hypertext transfer protocol authentication message includes the transaction identifier;

determine that authentication using the hypertext transfer protocol authentication message has failed;

in response to the determination, cause a transmission of an authentication failure message from the merchant platform to the user equipment;

receive, from the user equipment, a short message service message using the short message service address, wherein the short message service message includes a network service subscriber identifier of the user equipment and the transaction identifier;

authenticate the user using the short message service message; and cause a transmission of a charge customer message from the merchant platform to a network operator of the user for billing the transaction on behalf of the merchant, wherein the charge customer message includes an amount of the transaction and the network service subscriber identifier.

8. An apparatus of claim 7, wherein the apparatus is further caused to:
determine to use the network operator to bill the transaction for the merchant,
wherein the network operator provides access to the network for the user equipment.

9. An apparatus of claim 7, wherein the apparatus is further caused to:
cause a transmission, from the merchant platform to the user equipment, of a message that indicates an access code for a product to be delivered by the merchant according to the transaction in response to the short message service message.

10. An apparatus of claim 7, wherein the buy response message further comprises short message service recovery data.

11. An apparatus of claim 7, wherein the network service subscriber identifier of the user equipment include an international mobile subscriber identity, a mobile station international subscriber directory number, or a combination thereof.

12. An apparatus of claim 7, wherein the short message service message is sent from the user equipment without asking permission from the user.

13. A non-transitory computer-readable storage medium carrying one or more sequences of one or more instructions which, when executed by one or more processors, cause an apparatus embedded in a merchant platform to at least perform the following steps:

in response to a buy request message from a user equipment, causing a transmission of a buy response message from the merchant platform to the user equipment, wherein the buy response message includes a transaction identifier of a transaction between a user of the user equipment and a merchant, an uniform resource identifier for hypertext transfer protocol authentication, and a short message service address of the merchant;

receiving, from the user equipment via a network, a hypertext transfer protocol authentication message using the uniform resource identifier, wherein the hypertext transfer protocol authentication message includes the transaction identifier;

determining that authentication using the hypertext transfer protocol authentication message has failed;

in response to the determination, causing a transmission of an authentication failure message the merchant platform to the user equipment;

receiving, from the user equipment, a short message service message using the short message service address, wherein the short message service message includes a network service subscriber identifier of the user equipment and the transaction identifier;

authenticating the user using the short message service message; and causing a transmission of a charge customer message from the merchant platform to a network operator of the user for billing the transaction on behalf of the merchant, wherein the charge customer message includes an amount of the transaction and the network service subscriber identifier.

14. A non-transitory computer-readable storage medium of claim 13, wherein the apparatus is caused to further perform:
determining to use the network operator to bill the transaction for the merchant,
wherein the network operator provides access to the network for the user equipment.

15. A non-transitory computer-readable storage medium of claim 13, wherein the apparatus is caused to further perform:
causing a transmission, to the user equipment, of a message that indicates an access code for a product to be delivered by the merchant according to the transaction in response to the short message service message.

16. A non-transitory computer-readable storage medium of claim 13, wherein the buy response message further comprises short message service recovery data.

17. A non-transitory computer-readable storage medium of claim 13, wherein the network service subscriber identifier of the user equipment include an international mobile subscriber identity, a mobile station international subscriber directory number, or a combination thereof.

18. A non-transitory computer-readable storage medium of claim 13, wherein the short message service message is sent from the user equipment without asking permission from the user.

19. A system comprising:
at least one user equipment; and
a merchant platform configured to:
in response to a buy request message from the at least one user equipment, transmit a buy response message from the merchant platform to the user equipment, wherein the buy response message includes a transaction identifier of a transaction between a user of the at least one user equipment and a merchant, an uniform resource identifier for hypertext transfer protocol authentication, and a short message service address of the merchant;

receive, from the at least one user equipment via a network, a hypertext transfer protocol authentication message using the uniform resource identifier, wherein the hypertext transfer protocol authentication message includes the transaction identifier;

determine that authentication using the hypertext transfer protocol authentication message has failed;

in response to the determination, transmit an authentication failure message from the merchant platform to the at least one user equipment;

receive, from the at least one user equipment, a short message service message using the short message service address, wherein the short message service message includes a network service subscriber identifier of the at least one user equipment and the transaction identifier;

authenticate the user using the short message service message; and transmit a charge customer message from the merchant platform to a network operator of the user for billing the transaction on behalf of the merchant, wherein the charge customer message includes an amount of the transaction and the network service subscriber identifier.

20. A system of claim 19, wherein the merchant platform is further configured to:

determine to use the network operator to bill the transaction for the merchant, wherein the network operator provides access to the network for the user equipment.

21. A system of claim 19, wherein the merchant platform is further configured to:

transmit to the at least one user equipment a message that indicates an access code for a product to be delivered by the merchant according to the transaction in response to the short message service message.

22. A system of claim 19, wherein the buy response message further comprises short message service recovery data.

\* \* \* \* \*